(12) United States Patent
Kojima

(10) Patent No.: US 10,187,303 B2
(45) Date of Patent: Jan. 22, 2019

(54) WIRELESS COMMUNICATION SYSTEM, WIRELESS COMMUNICATION METHOD, BASE STATION, RELAY DEVICE, AND MOBILE STATION

(71) Applicant: FUJITSU LIMITED, Kawasaki-shi, Kanagawa (JP)

(72) Inventor: Yuji Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 582 days.

(21) Appl. No.: 14/480,736

(22) Filed: Sep. 9, 2014

(65) Prior Publication Data

US 2015/0109993 A1 Apr. 23, 2015

(30) Foreign Application Priority Data

Oct. 22, 2013 (JP) ................................. 2013-219359

(51) Int. Cl.
 *H04L 12/721* (2013.01)
 *H04W 76/15* (2018.01)
 (Continued)

(52) U.S. Cl.
 CPC ............. *H04L 45/44* (2013.01); *H04W 76/15* (2018.02); *H04W 28/06* (2013.01); *H04W 72/12* (2013.01); *H04W 84/047* (2013.01)

(58) Field of Classification Search
 CPC ............................ H04W 76/025; H04W 48/14
 (Continued)

(56) References Cited

U.S. PATENT DOCUMENTS 8,155,158 B2 * 4/2012 Saavedra ............ H04L 12/2867
 370/229
2006/0018309 A1 * 1/2006 Lee ....................... H04W 36/02
 370/355
(Continued)

FOREIGN PATENT DOCUMENTS

JP 2012-134817 7/2012
JP 2013-502152 1/2013

OTHER PUBLICATIONS

Yohei Hasegawa et al., "A Multi-path TCP Gateway with Dynamic Path-Load-Balancing", pp. 175-178 (4 pages). Technical Report of IEICE, NS2003-328, IN2003-283, Mar. 2004. English Abstract and partial English translation of No. 3. "Multiple-path TCP communication scheme"(please refer to the red marked section).
(Continued)

*Primary Examiner* — Alpus Hsu
*Assistant Examiner* — Camquyen Thai
(74) *Attorney, Agent, or Firm* — Fujitsu Patent Center

(57) ABSTRACT

A wireless communication system includes a mobile station, a base station, and a relay device. The base station is configured to execute first link aggregation (LA) communication. The base station transmits a state notification representing whether or not a state is an LA connection state in which the base station is connected with a mobile station so that the first LA communication is executable to the relay device, and the base station is controlled such that the first LA communication is executed based on the state of the base station. The relay device is configured to execute second LA communication. The relay device is controlled such that the second LA communication is executed based on the state notification.

19 Claims, 24 Drawing Sheets

(51) Int. Cl.
  *H04W 28/06* (2009.01)
  *H04W 72/12* (2009.01)
  *H04W 84/04* (2009.01)

(58) Field of Classification Search
  USPC ............... 370/329, 355; 455/422.1, 436, 515
  See application file for complete search history.

(56) References Cited

U.S. PATENT DOCUMENTS

| | | | | |
|---|---|---|---|---|
| 2010/0135214 | A1* | 6/2010 | Ishizu | H04W 48/18 370/328 |
| 2010/0157826 | A1* | 6/2010 | Yu | H04B 7/155 370/252 |
| 2011/0040888 | A1 | 2/2011 | Krishnaswamy et al. | |
| 2011/0199919 | A1* | 8/2011 | Lin | H04B 7/155 370/252 |
| 2012/0295624 | A1* | 11/2012 | Tang | H04L 61/2514 455/436 |
| 2013/0155938 | A1* | 6/2013 | Smith | H04L 69/163 370/315 |
| 2014/0092828 | A1* | 4/2014 | Sirotkin | H04L 1/1864 370/329 |

OTHER PUBLICATIONS

Takeshi Kawasaki et al., "Evaluation of LTE-WLAN Link Aggregation provided by LTE Femto cell base station", pp. 667 (3 pages). B-17-23, IEICE Mar. 19-22, 2013. Partial English translation of No. 2. "Packet distribution algorithm"(please refer to the red marked section).

Guidance for WTP (wireless technology park) 2013 Fujitsu booth exhibition [online], May 2013, [search Jun. 19, 2013], Internet URL:http://jp.fujitsu.com/telecom/carrier/events/pdf/wtp2013.pdf (3 pages). English translation of "BroadOne LTE femtocell"(please refer to the BroadOne LTE femtocell section).

Intel Corporation, Vodafone; New Study Item Proposal for Opportunistic Carrier Aggregation across 3GPP-LTE and WLAN, 3GPP TSG-RAN#53, Fukuoka, Japan, Sep. 13-16, 2011, RP-111094. URL:http://www.3gpp.org/ftp/tsg_ran/TSG_RAN/TSGR_53/Docs/RP-111094.zip, Sep. 13, 2011.

JPOA—Office Action of Japanese Patent Application No. 2013-219359 dated May 30, 2017, with relevant machine translation of the Office Action.

* cited by examiner

WIRELESS COMMUNICATION SYSTEM, WIRELESS COMMUNICATION METHOD, BASE STATION, RELAY DEVICE, AND MOBILE STATION

CROSS-REFERENCE TO RELATED APPLICATION

This application is based upon and claims the benefit of priority of the prior Japanese Patent application No. 2013-219359, filed on Oct. 22, 2013, the entire contents of which are incorporated herein by reference.

FIELD

The present invention relates to a wireless communication system, a wireless communication method, a base station, a relay device, and a mobile station.

BACKGROUND

A wireless communication system including a mobile station and a base station configured to wirelessly communicate with the mobile station has been known. As this type of the wireless communication system, for example, first to fourth wireless communication systems have been known (e.g., see Japanese Laid-open Patent Publication No. 2012-134817; Japanese National Publication of International Patent Application No. 2013-502152; Yohei Hasegawa, Tsutomu Murase, "A Multi-path TCP Gateway with Dynamic Path-Load-Balancing", IEICE technical report, IEICE, March, 2004, vol. 103, no. 692 (IN2003 249-336), p. 175-178; Takeshi Kawasaki et al., "Evaluation of LTE-WLAN Link Aggregation provided by LTE Femto cell base station", proceedings 1 of 2013 IEICE general conference, IEICE, March, 2013, B-17-23, p. 667; or Fujitsu Ltd., "Guidance for WTP (wireless technology park) 2013 Fujitsu booth exhibition", [online], May 2013, [search Jun. 19, 2013], Internet <URL:http://jp.fujitsu.com/telecom/carrier/events/pdf/wtp2013.pdf>).

In the first wireless communication system, LA communication is applied to a communication path having a first route connecting a first base station with a mobile station and a communication path having a second route connecting a second base station with the mobile station. LA stands for Link Aggregation. The LA communication refers to communication in which packets are transmitted by distributing packets to a plurality of communication paths. In the first wireless communication system, the LA communication is executed as a relay device arranged on a higher level side than the base station distributes packets to a plurality of communication paths.

In the second wireless communication system, the LA communication is applied to a communication path having a first route connecting a base station directly with a first mobile station and a communication path having a second route connecting the base station with the first mobile station via a second mobile station.

In the third wireless communication system, a transmission control protocol (TCP) connection is established for each of a plurality of routes, and the LA communication is applied to a plurality of TCP connections.

In the fourth wireless communication system, the LA communication is applied to a plurality of wireless communication paths between a femto base station and a mobile station.

SUMMARY

According to an aspect of the embodiments, a wireless communication system includes a mobile station, a base station that is configured to wirelessly communicate with the mobile station, and a relay device that is arranged at a higher level side than the base station and configured to communicate with the base station.

Further, the base station includes a first communicator, a first determiner, a first transmitter, and a first controller. The first communicator executes first link aggregation (LA) communication that is communication for transmitting a packet by distributing the packet to a plurality of wireless communication paths connecting the base station with the mobile station. The first determiner determines whether or not a state of the base station is an LA connection state in which the base station is connected with the mobile station such that the first LA communication is executable. The first transmitter transmits a state notification representing whether or not the state of the base station is the LA connection state to the relay device. The first controller controls the first communicator such that the first LA communication is executed based on whether or not the state of the base station is the LA connection state.

The relay device includes a second communicator, a second receiver, and a second controller. The second communicator executes second LA communication that is communication for transmitting a packet by distributing the packet to a plurality of communication paths connecting the relay device with the mobile station. The second receiver receives the state notification from the base station. The second controller controls the second communicator such that the second LA communication is executed based on the state notification.

A mobile station is the mobile station of a wireless communication system including the mobile station, a base station that is configured to wirelessly communicate with the mobile station, and a relay device that is arranged at a higher level side than the base station and configured to communicate with the base station.

Further, the mobile station includes a third transmitter. The third transmitter does not transmit an acknowledge response representing that a packet has been correctly received by the mobile station to an outside when the packet has been received through first LA communication and flag information has been received together with the packet. The flag information represents that an acknowledge response to the packet has been already transmitted together with the packet. The first LA communication is communication for transmitting the packet by distributing the packet to a plurality of wireless communication paths connecting the base station with the mobile station.

Further, the third transmitter does not transmit an acknowledge response representing that a packet has been correctly received by the mobile station to an outside when the packet has been received through the second LA communication. The second LA communication is communication for transmitting the packet by distributing the packet to a plurality of communication paths connecting the relay device with the mobile station.

In addition, the third transmitter transmits the acknowledge response to a transmission source set to the packet when the packet has been received through the first LA communication but the flag information has not been received together with the packet.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
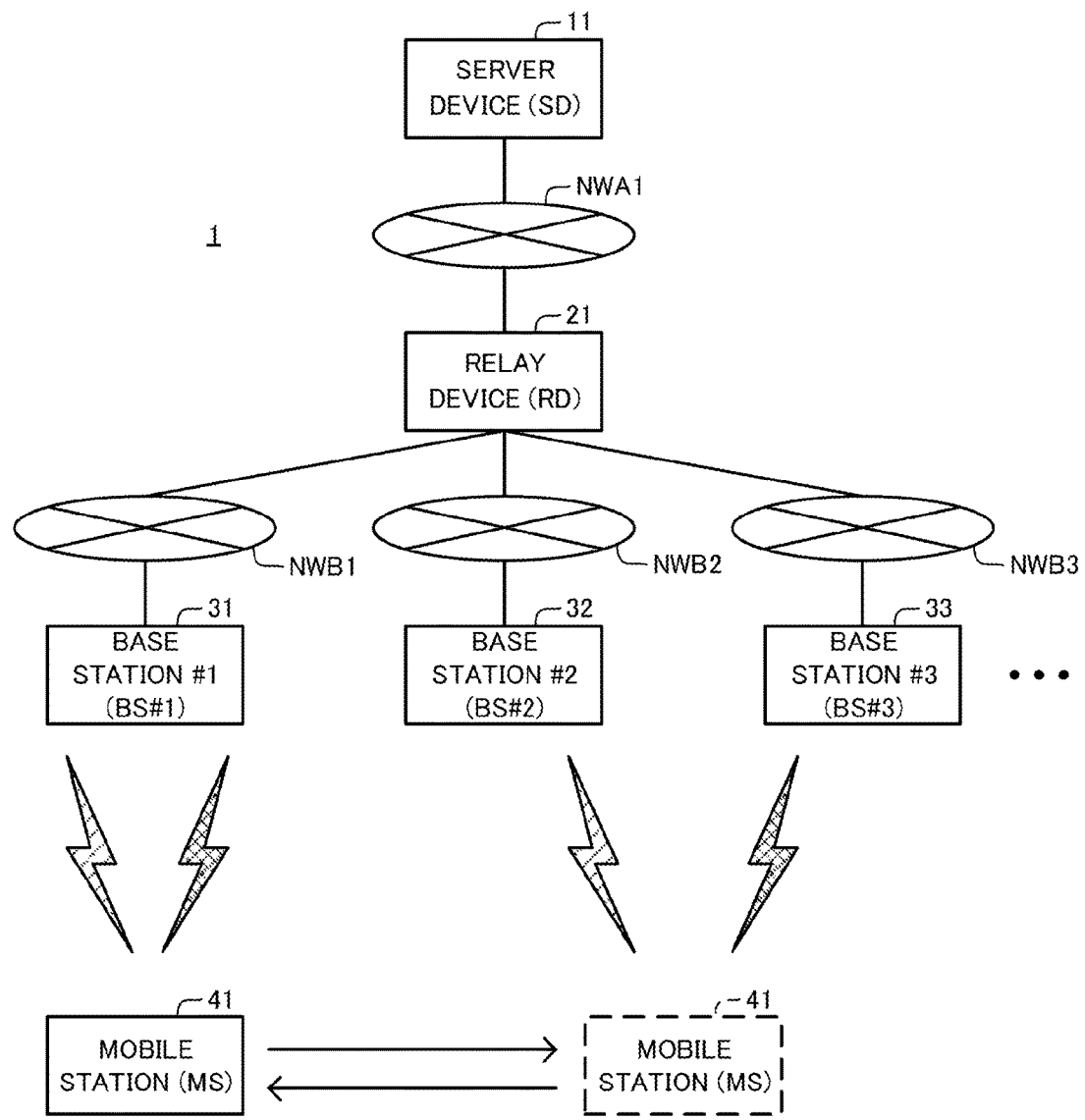
FIG. 1 is a diagram illustrating an example of configuration of a wireless communication system according to a first embodiment.

A wireless communication system is considered to be configured such that the base station in the fourth wireless communication system is applied as the base station in the first wireless communication system. In this case, when the base station is connected with the mobile station via a plurality of wireless communication paths, the base station can execute first LA communication. The first LA communication refers to communication in which the base station transmits packets by distributing packets to a plurality of wireless communication paths.

Further, in this case, the relay device can execute second LA communication on a plurality of communication paths that are the same in a section between the relay device and the base station but differ in a section between the base station and the mobile station. The second LA communication refers to communication in which the relay device transmits packets by distributing packets to a plurality of communication paths. In other words, in this case, the wireless communication system can execute both of the first LA communication and the second LA communication.

Meanwhile, the base station can promptly acquire information indicating a state (e.g., a rate of utilization, a transmission rate, or an error rate of the wireless communication path) of the wireless communication path between the base station and the mobile station. Thus, the base station can appropriately control distribution of packets to a plurality of wireless communication paths based on the acquired information. For this reason, the throughput when the base station executes the first LA communication is higher than the throughput when the relay device executes the second LA communication. The throughput refers to an amount of data transmitted to a mobile station per unit time.

However, the relay device hardly recognizes whether or not the base station is connected with the mobile station so that the first LA communication is executable. For this reason, there are cases in which the second LA communication other than the first LA communication is executed in the wireless communication system even when the first LA communication is executable. In other words, in the wireless communication system, it is difficult to appropriately perform switching between the first LA communication and the second LA communication. Thus, it is hard to sufficiently increase the throughput.

Hereinafter, in order to cope with at least one of the above-mentioned problems, exemplary embodiments of a wireless communication system, a wireless communication method, a base station, a relay device, and a mobile station according to the present invention will be described with reference to FIGS. 1 to 24.

<First Embodiment>
(Overview)

A wireless communication system according to a first embodiment includes a mobile station, a base station configured to wirelessly communicate with the mobile station, and a relay device that is arranged at a higher level side than the base station and configured to communicate with the base station. The base station is configured to execute first Link Aggregation (LA) communication that is communication in which packets are transmitted by distributing packets to a plurality of wireless communication paths connecting the base station with the mobile station.

The base station determines whether or not the state of the base station is an LA connection state in which the base station is connected with the mobile station so that the first LA communication is executable. Further, the base station transmits a state notification indicating whether or not the state of the base station is the LA connection state to the relay device. The base station controls the base station such that the first LA communication is executed based on whether or not the state of the base station is the LA connection state.

The relay device is configured to execute second LA communication that is communication in which packets are transmitted by distributing packets to a plurality of communication paths connecting the relay device with the mobile station. The relay device controls the relay device such that the second LA communication is executed based on the state notification received from the base station.

According to this configuration, when the state of the base station is the LA connection state, the state notification representing that the state of the base station is the LA connection state is transmitted from the base station to the relay device. Accordingly, the relay device can recognize that the base station can execute the first LA communication with the mobile station. Further, in this case, the relay device does not execute the second LA communication. Meanwhile, the base station executes the first LA communication.

Thus, for example, when both the first LA communication performed by the base station and the second LA communication performed by the relay device are executable, the wireless communication system can execute only the first LA communication. As a result, it is possible to increase the throughput, which an amount of data transmitted to the mobile station per unit time, to be higher than when the wireless communication system executes the second LA communication.

The wireless communication system according to the first embodiment will be described below in detail.

(Configuration)

As illustrated in FIG. 1, a wireless communication system 1 according to the first embodiment includes a server device 11, a relay device 21, a plurality of base stations 31, 32, 33, . . . and a mobile station 41. The server device 11 is also referred to as a "SD 11". The relay device 21 is also referred to as a "RD 21".

The base station 31 is also referred to as a "BS 31". The base stations 32 and 33 are same as the base station 31. The base station 31 is also referred to as a "base station #1 (BS#1 )". Similarly, the base station 32 is also referred to as a "base station #2 (BS#2 )". Similarly, the base station 33 is also referred to as a "base station #3 (BS#3)". The mobile station 41 is also referred to as a "MS 41".

The number of the base stations 31, 32, 33, . . . may be 4 or more. Each of the number of the server device 11 and the number of the mobile station 41 may be 2 or more.

In the wireless communication system 1, a plurality of wireless communications according to a plurality of wireless communication schemes are performed between the base stations 31, 32, 33, . . . and the mobile station 41. The plurality of wireless communication schemes include a first wireless communication scheme and a second wireless communication scheme. In this example, the first wireless communication scheme is long term evolution (LTE). In this example, the second wireless communication scheme is a wireless local area network (LAN) scheme (e.g., either of IEEE 802.11 series and IEEE 802.15 series). IEEE stands for Institute of Electrical and Electronics Engineers.

In the wireless communication system 1, wireless communication may be performed between the base station and the mobile station according to 3 or more wireless communication schemes. The wireless communication system 1 may be configured to perform communication according to any other wireless communication scheme as the wireless communication scheme. Examples of any other wireless communication scheme include LTE-Advanced, WiMAX, 3G, 2G, GSM (a registered trademark), EDGE, W-CDMA, UMTS, cdmaOne, and CDMA 2000.

WiMAX stands for Worldwide Interoperability for Microwave Access. 3G stands for 3rd Generation. 2G stands for 2nd Generation. GSM (a registered trademark) stands for Global System for Mobile Communications. EDGE stands for Enhanced Data Rates for GSM (a registered trademark) Evolution. W-CDMA stands for Wideband Code Division Multiple Access. UMTS stands for Universal Mobile Telecommunications System.

In this example, the base station #1 is a femto base station. The base station #1 is configured to simultaneously execute both the first wireless communication according to the first wireless communication scheme and the second wireless communication according to the second wireless communication scheme with the mobile station 41. The base station #1 is connected to communicate with the relay device 21 via a first base station side communication network NWB1. The base station #1 may be an evolved Node B (eNB), a Node B (NB), a macro base station, or a home base station. For example, the first base station side communication network NWB1 is an Internet services provider (ISP) network.

In this example, the base station #1 is a macro base station. The base station #1 is configured to perform only the first wireless communication with the mobile station 41. The base station #1 is connected to communicate with the relay device 21 via a second base station side communication network NWB2. The base station #1 may be an eNB, a NB, a femto base station, or a home base station. The base station #1 may be configured to execute the second wireless communication in addition to the first wireless communication. The base station #1 may be configured to execute third wireless communication according to a third wireless communication scheme in addition to or instead of the first wireless communication. For example, the second base station side communication network NWB2 is an ISP network or an evolved packet core (EPC) network.

In this example, the base station #1 is an access point. The base station #1 is configured to execute only the second wireless communication with the mobile station 41. The base station #1 is connected to communicate with the relay device 21 via a third base station side communication network NWB3. The base station #1 may be an eNB, a NB, a femto base station, a macro base station, or a home base station. The base station #1 may be configured to execute the first wireless communication in addition to the second wireless communication. The base station #1 may be configured to execute the third wireless communication according to the third wireless communication scheme in addition to or instead of the second wireless communication. For example, the third base station side communication network NWB3 is a public wireless LAN network.

Each of the base stations #1, #2, and #3 includes at least one cell (coverage area or communication area). In this example, a cell is a macro cell, a micro cell, a nano cell, a pico cell, a femto cell, a home cell, a sector cell, or the like. Each of the base stations #1, #2, and #3 is configured to wirelessly communicate with the mobile station 41 located within a cell provided by own station #1, #2, or #3.

Specifically, each of the base stations #1, #2, and #3 provides a radio resource (in this example, a time slot and a frequency band) in the cell of own station #1, #2, or #3. Each of the base stations #1, #2, and #3 performs communication with the mobile station 41 located in the cell of own station #1, #2, or #3 using the radio resource provided in the cell. A state, in which the base stations #1, #2, and #3 can perform communication with the mobile station 41 using the radio resources provided in the cells of the base stations #1, #2, and #3, is an example of a state in which the mobile station 41 is connected with the base stations #1, #2, and #3, respectively.

The base station #1 includes a first cell in which a radio resource used to perform the first wireless communication are provided and a second cell in which a radio resource used to perform the second wireless communication are provided. In this example, the first cell is different from the second cell. The first cell may be the same as the second cell.

The base stations #1 and #2 and a portion at the communication networks NWB1 and NWB2 (i.e., a higher level) side further than the base stations #1 and #2 in the wireless communication system 1 are also called E-UTRAN. E-UTRAN stands for Evolved Universal Terrestrial Radio Access Network.

In this example, the base stations #1, #2, and #3 are connected to the communication networks NWB1, NWB2, and NWB3 to perform wire communication, respectively. At least one of the base stations #1, #2, and #3 may be connected to the communication networks NWB1, NWB2, and NWB3 to perform wireless communication.

In this example, the relay device 21 is a gateway. The relay device 21 may be a switch, a router, or the like. The relay device 21 is connected to communicate with the server device 11 via a server side communication network NWA1. In other words, the relay device 21 is arranged at a higher level side than the base stations #1, #2, and #3. In this example, in a route through which data is transmitted from the server device 11 to the mobile station 41, the server device 11 is arranged at a higher level than the relay device 21, and the relay device 21 is arranged at a higher level than the base stations #1, #2, and #3. Further, in this example, in the route, the base stations #1, #2, and #3 are arranged at a higher level than the mobile station 41.

The mobile station 41 performs communication with the base stations #1, #2, and #3 using radio resource provided in the cell of the base station #1, #2, or #3 to which its own station 41 is connected. The mobile station 41 is also referred to as "user equipment (UE)".

Next, a configuration of each device will be described in further detail.

(Configuration; Relay Device)

Figure 2:
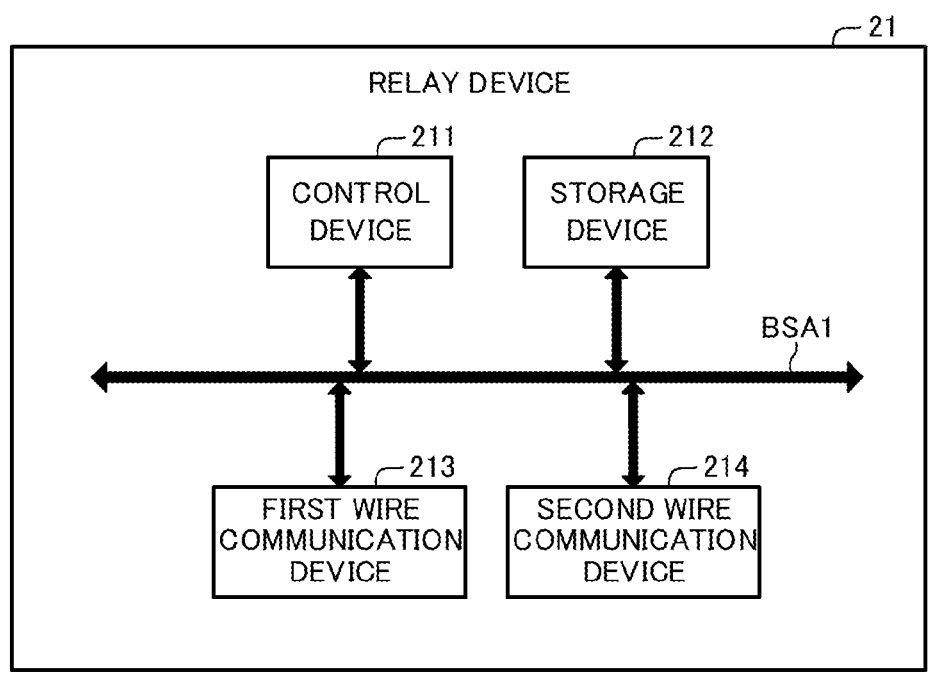
FIG. 2 is a diagram illustrating an example of configuration of a relay device according to the first embodiment.

As illustrated in FIG. 2, the relay device 21 includes a control device 211, a storage device 212, a first wire communication device 213, and a second wire communication device 214 which are connected with one another via a bus BSA1.

The control device 211 controls the respective components equipped in the relay device 21 in order to implement a function which will be described later. In this example, the control device 211 is configured with large scale integration (LSI). The control device 211 may be configured with a programmable logic device (PLD). The control device 211 may include a processor such as a central processing unit (CPU), and a function which will be described later may be implemented as the processor executes a program stored in the storage device 212.

The storage device 212 stores information in a readable/writable manner. For example, the storage device 212 includes at least one of a RAM, a ROM, an HDD, an SSD, a semiconductor memory, and an organic memory. RAM stands for Random Access Memory. ROM stands for Read Only Memory. HDD stands for Hard Disk Drive. SSD stands for Solid State Drive. The storage device 212 may include a recording medium such as a flexible disk, an optical disk, a magneto optical disk, or a semiconductor memory and a device capable of reading information from the recording medium.

The first wire communication device 213 includes a communication port that is connectable with a communication cable. The first wire communication device 213 is connected to the server side communication network NWA1 via the communication cable, and performs communication with another device (e.g., the server device 11) connected to the server side communication network NWA1.

the second wire communication device 214 includes a communication port that is connectable with a communication cable. The second wire communication device 214 is connected to the communication networks NWB1, NWB2, and NWB3 via the communication cable, and performs communication with another device (e.g., each of the base stations #1, #2, and #3 ) connected to the communication networks NWB1, NWB2, and NWB3.

(Configuration; Server Device)

Although not illustrated, the server device 11 includes the same control device as the control device 211, the same storage device as the storage device 212, and the same wire communication device as the first wire communication device 213. The wire communication device equipped in the server device 11 is connected to the server side communication network NWA1, and performs communication with another device (e.g., the relay device 21) connected to the server side communication network NWA1.

(Configuration; Base Station #1)

Figure 3:
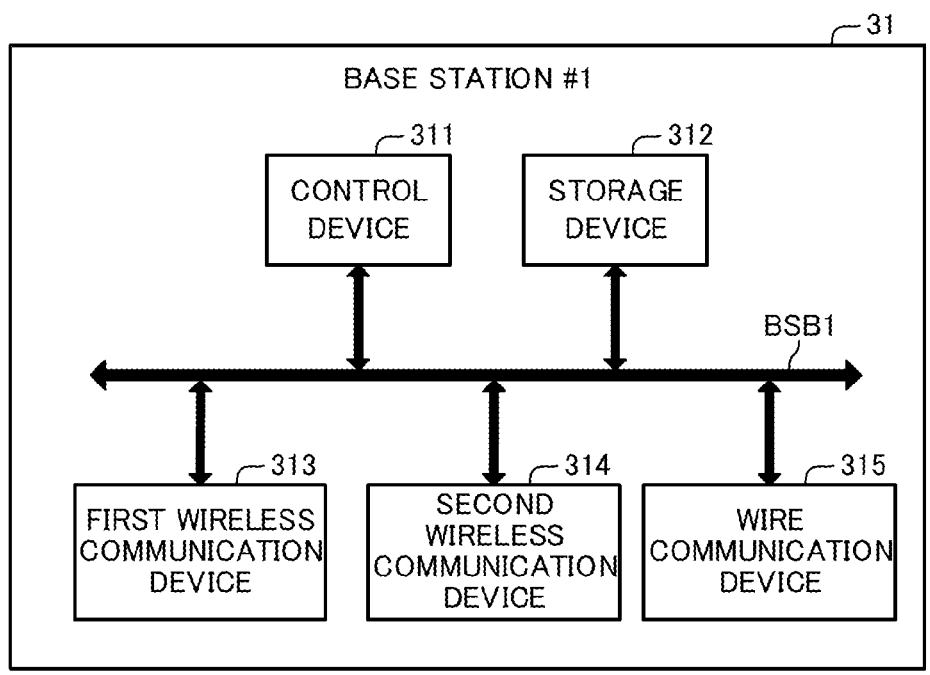
FIG. 3 is a diagram illustrating an example of configuration of a base station #1 according to the first embodiment.

As illustrated in FIG. 3, the base station #1 includes a control device 311, a storage device 312, a first wireless communication device 313, a second wireless communication device 314, and wire communication device 315 which are connected to one another via a bus BSB1.

The control device 311 controls the respective components equipped in the base station #1 in order to implement a function which will be described later, similarly to the control device 211. The storage device 312 has the same configuration as the storage device 212.

The first wireless communication device 313 performs the first wireless communication according to the first wireless communication scheme with the mobile station 41 located in the first cell of the base station #1 through an antenna (not illustrated). The second wireless communication device 314 performs the second wireless communication according to the second wireless communication scheme with the mobile station 41 located in the second cell of the base station #1 through an antenna (not illustrated).

The wire communication device 315 includes a communication port that is connectable with a communication cable. The wire communication device 315 is connected to the first base station side communication network NWB1 via the communication cable, and performs communication with another device (e.g., the relay device 21) connected to the first base station side communication network NWB1.

(Configuration; Base Station #2)

Figure 4:
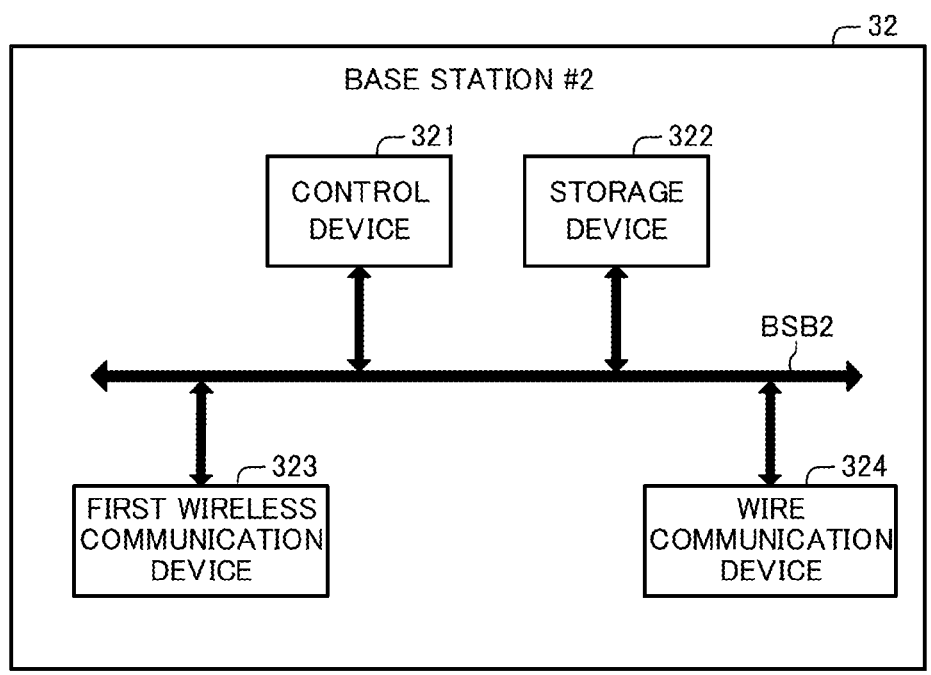
FIG. 4 is a diagram illustrating an example of configuration of a base station #1 according to the first embodiment.

As illustrated in FIG. 4, the base station #2 includes a control device 321, a storage device 322, a first wireless communication device 323, and a wire communication device 324 which are connected with one another via a bus BSB2.

The control device 321 controls the respective components equipped in the base station #2 in order to implement a function which will be described later, similarly to the control device 311. The storage device 322 has the same configuration as the storage device 312. The first wireless communication device 323 has the same configuration as the first wireless communication device 313.

the wire communication device 324 has the same configuration as the wire communication device 315. The wire communication device 324 is connected to the second base station side communication network NWB2 via a communication cable, and performs communication with another device (e.g., the relay device 21) connected to the second base station side communication network NWB2.

(Configuration; Base Station #3 )

Figure 5:
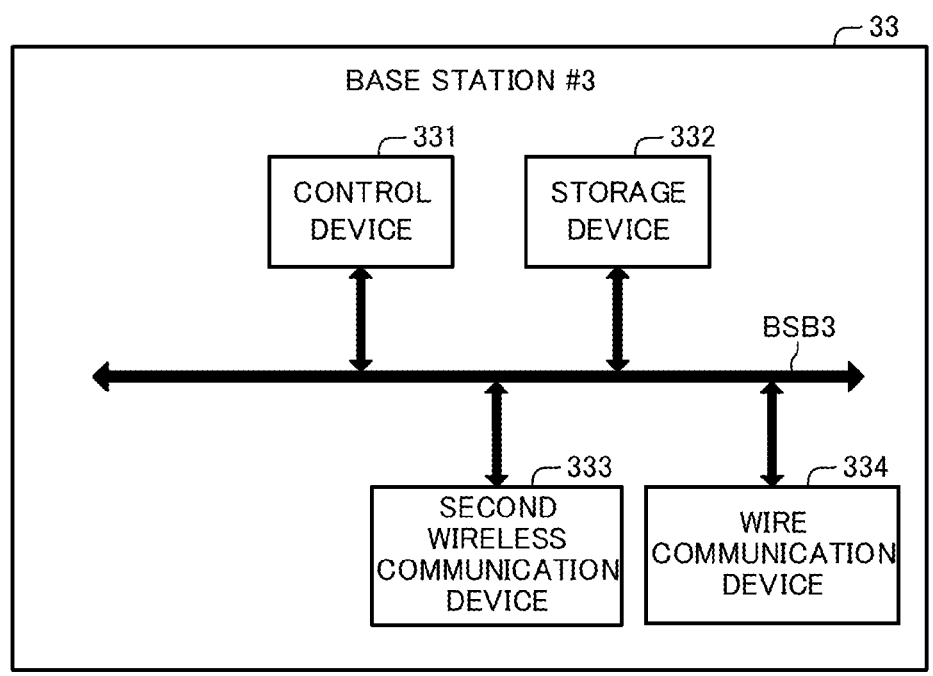
FIG. 5 is a diagram illustrating an example of configuration of a base station #1 according to the first embodiment.

As illustrated in FIG. 5, the base station #3 includes a control device 331, a storage device 332, a second wireless communication device 333, and a wire communication device 334 which are connected with one another via a bus BSB3.

The control device 331 controls the respective components equipped in the base station #3 in order to implement a function which will be described later, similarly to the control device 311. The storage device 332 has the same configuration as the storage device 312. The second wireless communication device 333 has the same configuration as the second wireless communication device 314.

The wire communication device 334 has the same configuration as the wire communication device 315. The wire communication device 334 is connected to the third base station side communication network NWB3 via a communication cable, and performs communication with another device (e.g., the relay device 21) connected to the third base station side communication network NWB3.

(Configuration; the Mobile Station)

Figure 6:
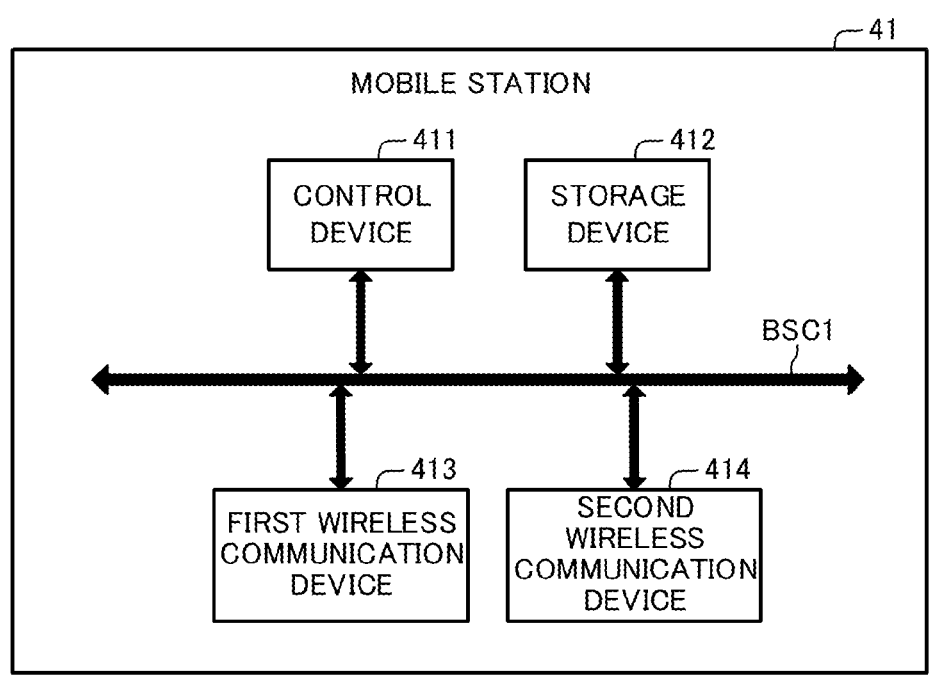
FIG. 6 is a diagram illustrating an example of configuration of a mobile station according to the first embodiment.

As illustrated in FIG. 6, the mobile station 41 includes a control device 411, a storage device 412, a first wireless communication device 413, and a second wireless communication device 414 which are connected with one another via a bus BSC1.

The control device 411 controls the respective components equipped in the mobile station 41 in order to implement a function which will be described later, similarly to the control device 311. The storage device 412 has the same configuration as the storage device 312.

The first wireless communication device 413 performs the first wireless communication according to the first wireless communication scheme with the base station #1 or #2 using radio resources provided in the cell of the base station #1 or #2 to which its own station 41 is connected through an antenna (not illustrated). The second wireless communication device 414 performs the second wireless communication according to the second wireless communication scheme with the base station #1 or #3 using radio resources provided in the cell of the base station #1 or #3 to which its own station 41 is connected through an antenna (not illustrated).

(Function; Base Station #1)

Figure 7:
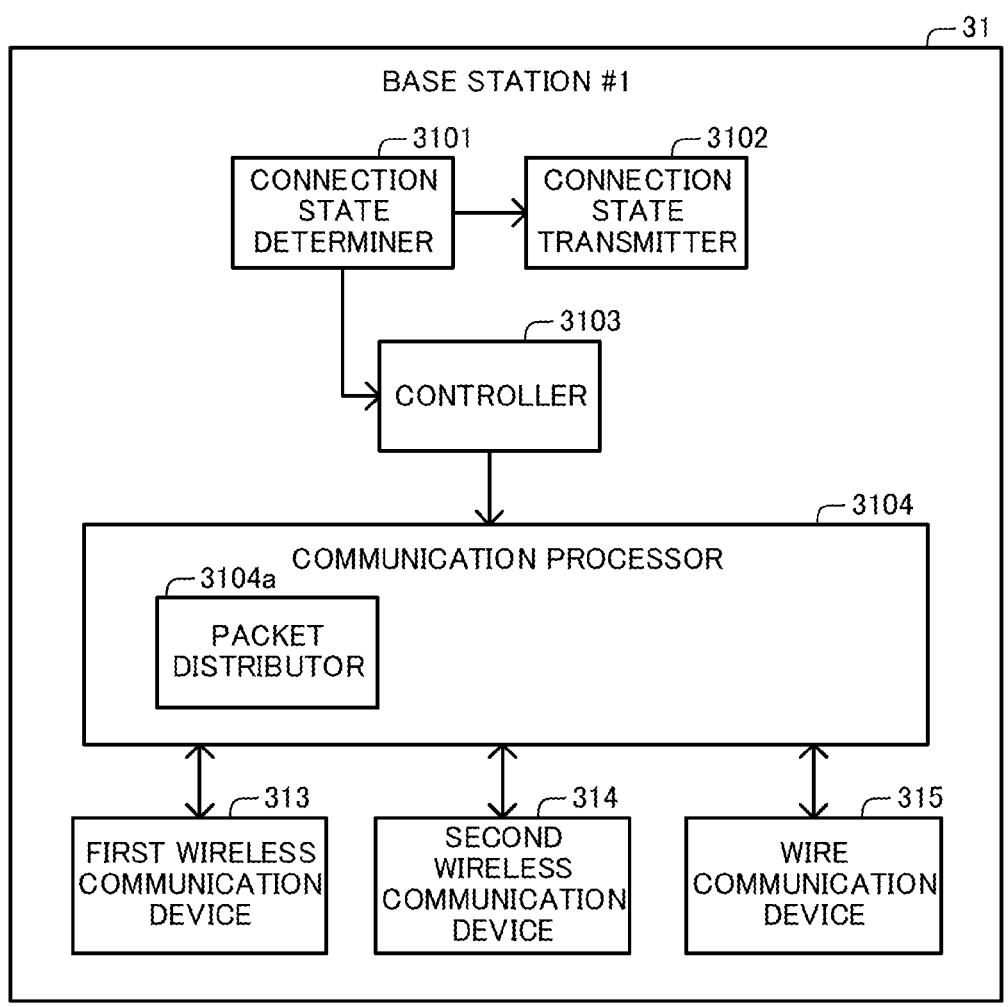
FIG. 7 is a block diagram illustrating an example of function of the base station #1 according to the first embodiment.

Next, a function of the base station #1 will be described. As illustrated in FIG. 7, a function of the base station #1 includes a connection state determiner (a first determiner) 3101, a connection state transmitter (a first transmitter) 3102, a controller (a first controller) 3103, and a communication processor (a first communicator) 3104.

The connection state determiner 3101 determines whether or not a state of the base station #1 is a first connection state in which the base station #1 is connected with the mobile station 41 such that the first wireless communication according to the first wireless communication scheme is executable. For example, a situation, in which the mobile station 41 is located in the first cell in which radio resources used to perform the first wireless communication are provided by the base station #1, is an example of a situation in which the state of the base station #1 is the first connection state.

Similarly, the connection state determiner 3101 determines whether or not the state of the base station #1 is a second connection state in which the base station #1 is connected with the mobile station 41 such that the second wireless communication according to the second wireless communication scheme is executable. For example, when the mobile station 41 is located in the second cell in which radio resources used to perform the second wireless communication are provided by the base station #1, it is an example in which the state of the base station #1 is the second connection state.

Further, the connection state determiner 3101 determines whether or not the state of the base station #1 is an LA connection state in which the base station #1 is connected with the mobile station 41 such that the first LA communication is executable.

The first LA communication refers to communication in which packets are transmitted by distributing packets to the first wireless communication path and the second wireless communication path which are connecting the base station #1 with the mobile station 41. For example, the LA communication is communication performed using one logical line (virtual line) configured such that a plurality of wireless communication paths (physical lines) are aggregated.

The first wireless communication path is a communication path used to perform the first wireless communication according to the first wireless communication scheme. In this example, the first wireless communication path is formed by the first wireless communication device 313 and the first wireless communication device 413. Similarly, the second wireless communication path is a communication path used to perform the second wireless communication according to the second wireless communication scheme. In this example, the second wireless communication path is formed by the second wireless communication device 314 and the second wireless communication device 414.

In this example, when the state of the base station #1 is determined to be the first connection state and the state of the base station #1 is determined to be the second connection state, the connection state determiner 3101 determines that the state of the base station #1 is the LA connection state. Meanwhile, when the state of the base station #1 is determined to be not the first connection state or when the state of the base station #1 is determined to be not the second connection state, the connection state determiner 3101 that the state of the base station #1 is not the LA connection state. The connection state determiner 3101 determines whether or not the state of the base station #1 is the LA connection state for each mobile station. There are cases in which the state of the base station #1 with respect to a certain mobile station is the LA connection state, but the state of the base station #1 with respect to another mobile station is not the LA connection state.

When the connection state determiner 3101 determines that the state of the base station #1 is the LA connection state, the connection state transmitter 3102 transmits an LA connection state notification to the relay device 21. The LA connection state notification is information indicating that the state of the base station #1 is the LA connection state. In this example, the connection state transmitter 3102 transmits the LA connection state notification as a state notification.

Figure 8:
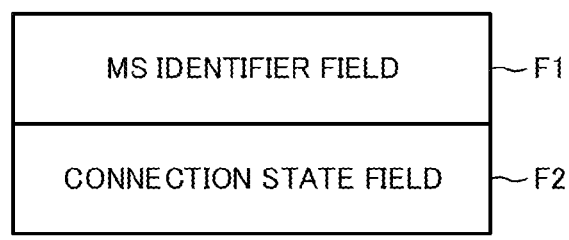
FIG. 8 is an explanatory diagram conceptually illustrating an example of state notification according to the first embodiment.

As illustrated in FIG. 8, the state notification includes an MS identifier field F1 and a connection state field F2. The MS identifier field F1 is a filed storing an identifier identifying a mobile station (in this example, the mobile station 41). The connection state field F2 is a field storing information indicating whether or not the state of the base station #1 is the LA connection state.

Meanwhile, when the connection state determiner 3101 determines that the state of the base station #1 is not the LA connection state, the connection state transmitter 3102 transmits the LA non-connection state notification to the relay device 21. The LA non-connection state notification is information indicating that the state of the base station #1 is not the LA connection state. In this example, the connection state transmitter 3102 transmits the LA non-connection state notification as the state notification.

When the connection state determiner 3101 determines that the state of the base station #1 is the LA connection state, the controller 3103 controls the communication processor 3104 such that the first LA communication is executed. In other words, the controller 3103 sets a state of the communication processor 3104 to the first LA communication state which will be described later.

Meanwhile, when the connection state determiner 3101 determines that the state of the base station #1 is not the LA connection state, the controller 3103 controls the communication processor 3104 such that the first LA communication is not executed.

In this example, when the state of the base station #1 is determined to be not the LA connection state and then the state of the base station #1 is determined to be the first connection state, the controller 3103 controls the communication processor 3104 such that only the first wireless communication is executed. In other words, the controller 3103 sets the state of the communication processor 3104 to the first wireless communication state which will be described later.

Similarly, when the state of the base station #1 is determined to be not the LA connection state and then the state of the base station #1 is determined to be the second connection state, the controller 3103 controls the communication processor 3104 such that only the second wireless communication is executed. In other words, the controller 3103 sets the state of the communication processor 3104 to the second wireless communication state which will be described later.

When the state of the base station #1 is determined to be not the first connection state and then the state of the base station #1 is determined to be not the second connection state, the controller 3103 controls the communication processor 3104 such that any wireless communication is not executed. In other words, the controller 3103 sets the state of the communication processor 3104 to a non-communication state.

The communication processor 3104 receives packets from the relay device 21 via the wire communication device 315.

The communication processor 3104 executes wireless communication in any one of the first LA communication state, the first wireless communication state, the second wireless communication state, and the non-communication state. The communication processor 3104 switches the state according to control by the controller 3103.

The communication processor 3104 includes a packet distributor 3104a. The communication processor 3104 executes the first LA communication in the first LA communication state. In the first LA communication state, the packet distributor 3104a outputs packets to the first wireless communication device 313 and the second wireless communication device 314 so that received packets are distributed to the first wireless communication device 313 and the second wireless communication device 314.

In this example, the packet distributor 3104a acquires information indicating a state of the first wireless communication path and information indicating a state of the second wireless communication path. Further, the packet distributor 3104a controls distribution of packets based on the acquired information (e.g., adjusts a distribution ratio or the like). For example, the state of the wireless communication path is a rate of utilization, a transmission rate, or an error rate of the wireless communication path.

Each of the first wireless communication device 313 and the second wireless communication device 314 transmits packets input to their own devices to the mobile station 41. In other words, in the first LA communication state, the communication processor 3104 executes the first LA communication by simultaneously executing the first wireless communication and the second wireless communication.

The communication processor 3104 executes only the first wireless communication in the first wireless communication state. In this example, the communication processor 3104 outputs received packets to only the first wireless communication device 313 in the first wireless communication state. The first wireless communication device 313 transmits packets input to its own device to the mobile station 41.

Similarly, the communication processor 3104 executes only the second wireless communication in the second wireless communication state. In this example, the communication processor 3104 outputs received packets to only the second wireless communication device 314 in the second wireless communication state. The second wireless communication device 314 transmits packets input to its own device to the mobile station 41.

When a non-delivered packet (which will be described later) transferred from the relay device 21 is received, the communication processor 3104 executes the first LA communication, and transmits the non-delivered packet to the mobile station 41 together with flag information. The flag information is information representing that an acknowledge response to a packet has been already transmitted.

(Function; Relay Device)

Figure 9:
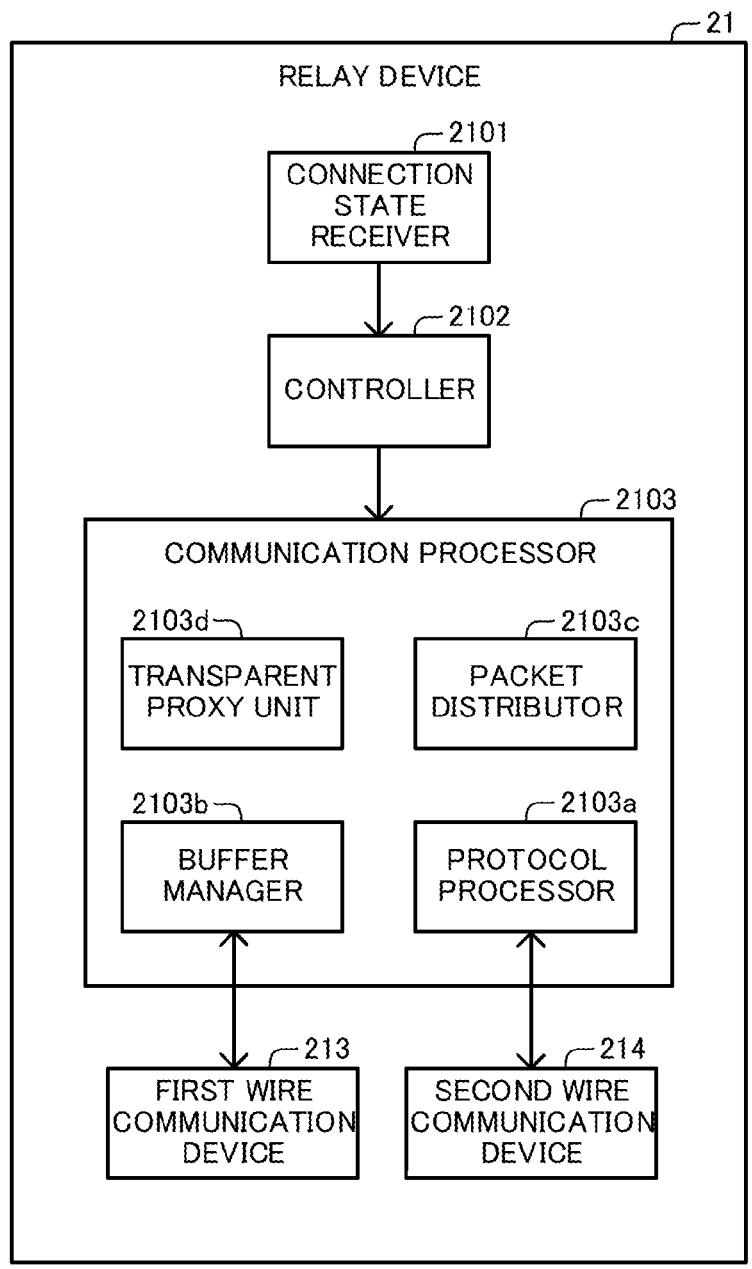
FIG. 9 is a block diagram illustrating an example of function of the relay device according to the first embodiment.

Next, a function of the relay device 21 will be described. As illustrated in FIG. 9, a function of the relay device 21 includes a connection state receiver (a second receiver) 2101, a controller (a second controller) 2102, and a communication processor (a second communicator) 2103.

The connection state receiver 2101 receives the LA connection state notification from the base station #1. Similarly, the connection state receiver 2101 receives the LA non-connection state notification from the base station #1.

When the LA connection state notification is received, the controller 2102 controls the communication processor 2103 such that the second LA communication is not executed. In this example, the controller 2102 sets a state of the communication processor 2103 to the first LA communication relay state which will be described later.

Meanwhile, when the LA non-connection state notification is received and then the relay device 21 and the mobile station 41 are connected to communicate via each of the first communication path and the second communication path, the controller 2102 controls the communication processor 2103 such that the second LA communication is executed. In other words, the controller 2102 sets the state of the communication processor 2103 to the second LA communication state which will be described later.

The first communication path is a communication path used to perform the first wireless communication according to the first wireless communication scheme in a section (i.e., a wireless communication path) between the mobile station 41 and any one of the base stations #1, #2, and #3. In this example, the first communication path has a route connecting the relay device 21 with the mobile station 41 through the base station #1 or the base station #2. Similarly, the second communication path is a communication path used to perform the second wireless communication according to the second wireless communication scheme in a section (i.e., a wireless communication path) between the mobile station 41 and any one of the base stations #1, #2, and #3. In this example, the second communication path has a route connecting the relay device 21 with the mobile station 41 through the base station #1 or the base station #3.

When the LA non-connection state notification is received and then the relay device 21 and the mobile station 41 are connected to communicate via only the first communication path, the controller 2102 controls the communication processor 2103 such that a first non-LA communication relay is executed. In other words, the controller 2102 sets the state of the communication processor 2103 to a first non-LA communication relay state which will be described later.

Similarly, when the LA non-connection state notification is received and then the relay device 21 and the mobile station 41 are connected to communicate via only the second communication path, the controller 2102 controls the communication processor 2103 such that a second non-LA communication relay is executed. In other words, the controller 2102 sets the state of the communication processor 2103 to a second non-LA communication relay state which will be described later.

The communication processor 2103 receives packets from the server device 11 via the first wire communication device 213.

The communication processor 2103 executes in any one of the first LA communication relay state, the second LA communication state, the first non-LA communication relay state, and the second non-LA communication relay state. The communication processor 2103 switches the state according to control by the controller 2102.

The communication processor 2103 includes a protocol processor 2103a, a buffer manager (a second transferor) 2103b, a packet distributor 2103c, and a transparent proxy unit (a second transmitter) 2103d.

The communication processor 2103 relays communication through a main connection between the server device 11 and the mobile station 41 in the first LA communication relay state. In other words, in the first LA communication relay state, the communication processor 2103 receives packets from the server device 11, and transmits the received packets to the base station #1. The main connection is a connection established between the mobile station 41 and the server device 11 according to a certain communication protocol (in this example, the TCP). The main connection is also referred to as a "main connection #1".

TCP stands for Transmission Control Protocol. The communication protocol may be a DCCP or an SCTP. DCCP stands for Datagram Congestion Control Protocol. SCTP stands for Stream Control Transmission Protocol.

The communication processor 2103 executes the second LA communication in the second LA communication state. The second LA communication is communication in which packets are transmitted by distributing packets to the first LA communication path and the second LA communication path which are connecting the relay device 21 with the mobile station 41. The first LA communication path is a connection established in the first communication path connecting the relay device 21 with the mobile station 41. Similarly, the second LA communication path is a connection established in the second communication path connecting the relay device 21 with the mobile station 41.

In the second LA communication state, the protocol processor 2103a establishes a connection (a first sub connection) according to the communication protocol through the first communication path connecting the relay device 21 with the mobile station 41 as the first LA communication path. Similarly, in the second LA communication state, the protocol processor 2103a establishes a connection (a second sub connection) according to the communication protocol through the second communication path connecting the relay device 21 with the mobile station 41 as the second LA communication path. The first sub connection is also referred to as a "sub connection #1-1". The second sub connection is also referred to as a "sub connection #1-2".

Figure 10:
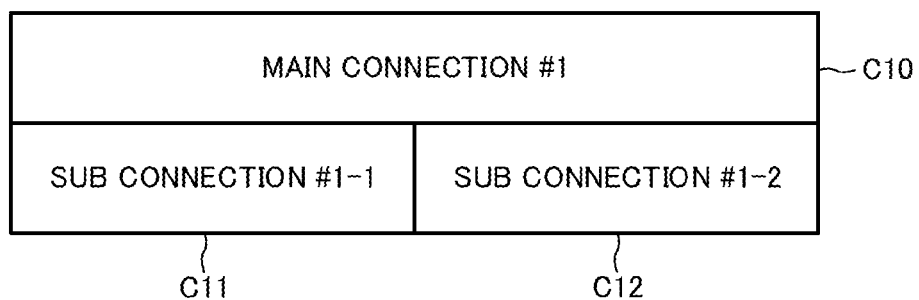
FIG. 10 is an explanatory diagram conceptually illustrating an example of protocol stack in a transport layer of a sub connection according to the first embodiment.

In this example, as illustrated in FIG. 10 illustrating a protocol stack in a transport layer, a first sub connection C11 and a second sub connection C12 are arranged below a main connection C10. In this example, packets transmitted through the main connection are encapsulated and then transmitted to each of the sub connections. In other words, packets transmitted through each of the sub connections include a header in the main connection and a header in the sub connection.

Further, in the second LA communication state, when the LA connection state notification is received from the base station #1, the protocol processor 2103a releases the established first sub connection and the second sub connection.

The buffer manager 2103b manages a first buffer that temporarily stores packets to be transmitted through the first LA communication path and a second buffer that temporarily stores packets to be transmitted through the second LA communication path. Each of the first buffer and the second buffer is configured with the storage device 212.

The buffer manager 2103b transmits packets stored in the first buffer through the first sub connection via the second wire communication device 214. Similarly, the buffer manager 2103b transmits packets stored in the second buffer through the second sub connection via the second wire communication device 214.

The buffer manager 2103b deletes (erases) at least one packet, for which an acknowledge response (e.g., an ACK signal) has been received through the sub connection, among transmitted packets from the first buffer and the second buffer. The acknowledge response is information representing that a packet has been correctly received by mobile station 41.

In other words, in the second LA communication state, the communication processor 2103 executes the second LA communication by simultaneously executing the first communication using the first sub connection and the second communication using the second sub connection.

Further, when congestion occurs in a certain LA communication path, the buffer manager 2103b performs congestion control by reducing an amount of data of packets to be transmitted per unit time in the corresponding LA communication path. For example, the buffer manager 2103b performs congestion control according to a slow start, a congestion prevention, a high-speed TCP retransmission algorithm, and/or, a fast recovery.

In the second LA communication state, the packet distributor 2103c causes the first buffer and the second buffer to store packets so that received packets are distributed to the first buffer and the second buffer. In this example, the packet distributor 2103c controls distribution of packets based on an amount of data of packets stored in the first buffer and an amount of data of packets stored in the second buffer. For example, the packet distributor 2103c adjusts a distribution ratio of packets so that the buffers store the same amount of data.

In the second LA communication state, when a packet in which the mobile station 41 is set as the destination is received, the transparent proxy unit 2103d transmits an acknowledge response for the main connection to a transmission source (e.g., the server device 11) set to the packet through the main connection. The acknowledge response is information representing that the packet has been correctly received by the mobile station 41. In this example, the transparent proxy unit 2103d transmits an ACK signal as the acknowledge response. The ACK signal is transmitted by the relay device 21 instead of the mobile station 41 set as the destination of the packet and thus called a pseudo ACK signal.

In the second LA communication state, when the LA connection state notification is received from the base station #1, the buffer manager 2103b transfers (transmits) non-delivered packets to the base station #1. The non-delivered packets are packets, in which the mobile station 41 is set as the destination, stored in the first buffer or the second buffer among packets received from the server device 11.

In other words, the non-delivered packets are packets that have not still correctly received by the mobile station 41 and held to be transmitted to the mobile station 41. When the acknowledge response representing that a certain packet has been correctly received by the mobile station 41 has not been received from the mobile station 41 yet, it is an example in which the corresponding packet has not been correctly received by the mobile station 41.

The communication processor 2103 executes the first non-LA communication relay in the first non-LA communication relay state. The first non-LA communication relay is communication for relaying communication performed by the main connection between the server device 11 and the mobile station 41. In other words, in the first non-LA communication relay state, the communication processor 2103 receives packets from the server device 11, and transmits the received packets to the base stations #1 or #2 that is connected to the mobile station 41 so that the first wireless communication according to the first wireless communication scheme is executable. The base stations #1 and #2 executes the first wireless communication. As a result, packets are transmitted to the mobile station 41. The first non-LA communication relay and the first wireless communication configure the first non-LA communication.

Similarly, the communication processor 2103 executes the second non-LA communication relay in the second non-LA communication relay state. The second non-LA communication relay is communication for relaying communication performed by the main connection between the server device 11 and the mobile station 41. In other words, in the second non-LA communication relay state, the communication processor 2103 receives packets from the server device 11, and transmits the received packets to the base stations #1 or #3 that is connected to the mobile station 41 so that the second wireless communication according to the second wireless communication scheme is executable. The base stations #1 and #3 executes the second wireless communication. As a result, packets are transmitted to the mobile station 41. The second non-LA communication relay and the second wireless communication configure the second non-LA communication.

(Function; Mobile Station)

Figure 11:
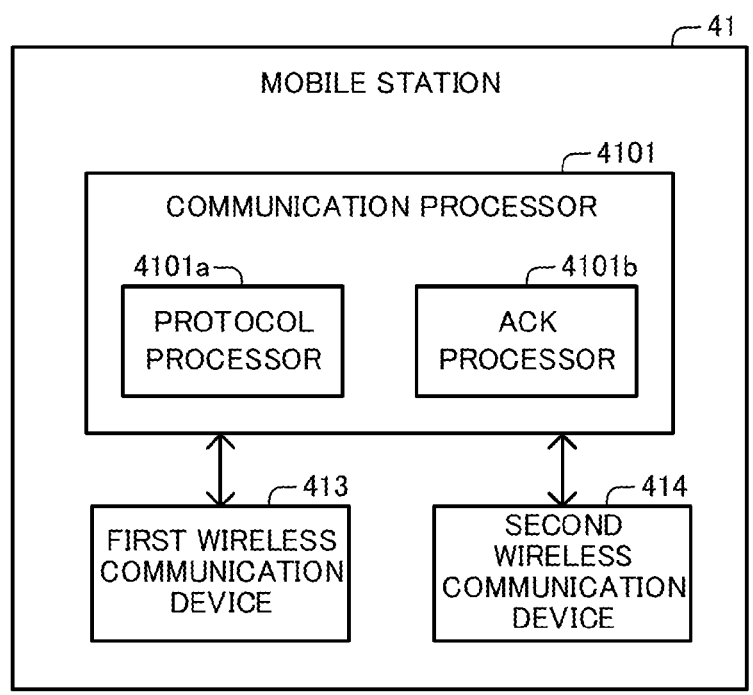
FIG. 11 is a block diagram illustrating an example of function of the mobile station according to the first embodiment.

Next, a function of the mobile station 41 will be described. As illustrated in FIG. 11, a function of the mobile station 41 includes a communication processor 4101. The communication processor 4101 includes a protocol processor 4101a and an ACK processor (a third transmitter) 4101b.

The communication processor 4101 receives packets transmitted through each of the first LA communication, the second LA communication, the first non-LA communication, and the second non-LA communication via the first wireless communication device 413 and/or the second wireless communication device 414.

The protocol processor 4101a establishes the main connection with the server device 11. Further, the protocol processor 4101a establishes the first sub connection and the second sub connection with the relay device 21.

When packets have been received through the first LA communication but the flag information has not been received together with the packets, the ACK processor 4101b transmits the acknowledge response for the main connection to the transmission source (e.g., the server device 11) set to the packets through the main connection. The acknowledge response is information representing that the packets have been correctly received by the mobile station 41. Further, when packets have been received through the first non-LA communication or the second non-LA communication, the ACK processor 4101b transmits the acknowledge response for the main connection to the transmission source (e.g., the server device 11) set to the packets through the main connection.

When packets have been received through the first LA communication and the flag information has been received together with the packets, the ACK processor 4101b does not transmit the acknowledge response for the main connection. Further, when packets have been received through the second LA communication, the ACK processor 4101b transmits the acknowledge response for the sub connection to the transmission source (e.g., the relay device 21) set to the packets in the header in the sub connection. Meanwhile, in this case, the ACK processor 4101b does not transmit the acknowledge response for the main connection to the outside.

(Operation)

Next, an operation of the wireless communication system 1 will be described with reference to FIG. 12 to FIG. 17.

First, the mobile station 41 is assumed to be connected to wirelessly communicate with any one of the base stations #1, #2, and #3 . In this case, when communication starts between the mobile station 41 and the server device 11, the mobile station 41 establishes a connection (the main connection #1) with the server device 11 according to the communication protocol (in this example, the TCP) (step S101 in FIG. 12).

Thereafter, the mobile station 41 is assumed to be arranged at a position included in both the first cell and the second cell. In this case, the mobile station 41 is connected to the base station #1 so that the first wireless communication according to the first wireless communication scheme is executable (step S102 in FIG. 12). This connection is also referred to as a "connection #1". Further, the mobile station 41 is connected the base station #1 so that the second wireless communication according to the second wireless communication scheme is executable (step S103 in FIG. 12). This connection is also referred to as a "connection #2". As a result, the state of the base station #1 becomes the first connection state and the second connection state.

Figure 12:
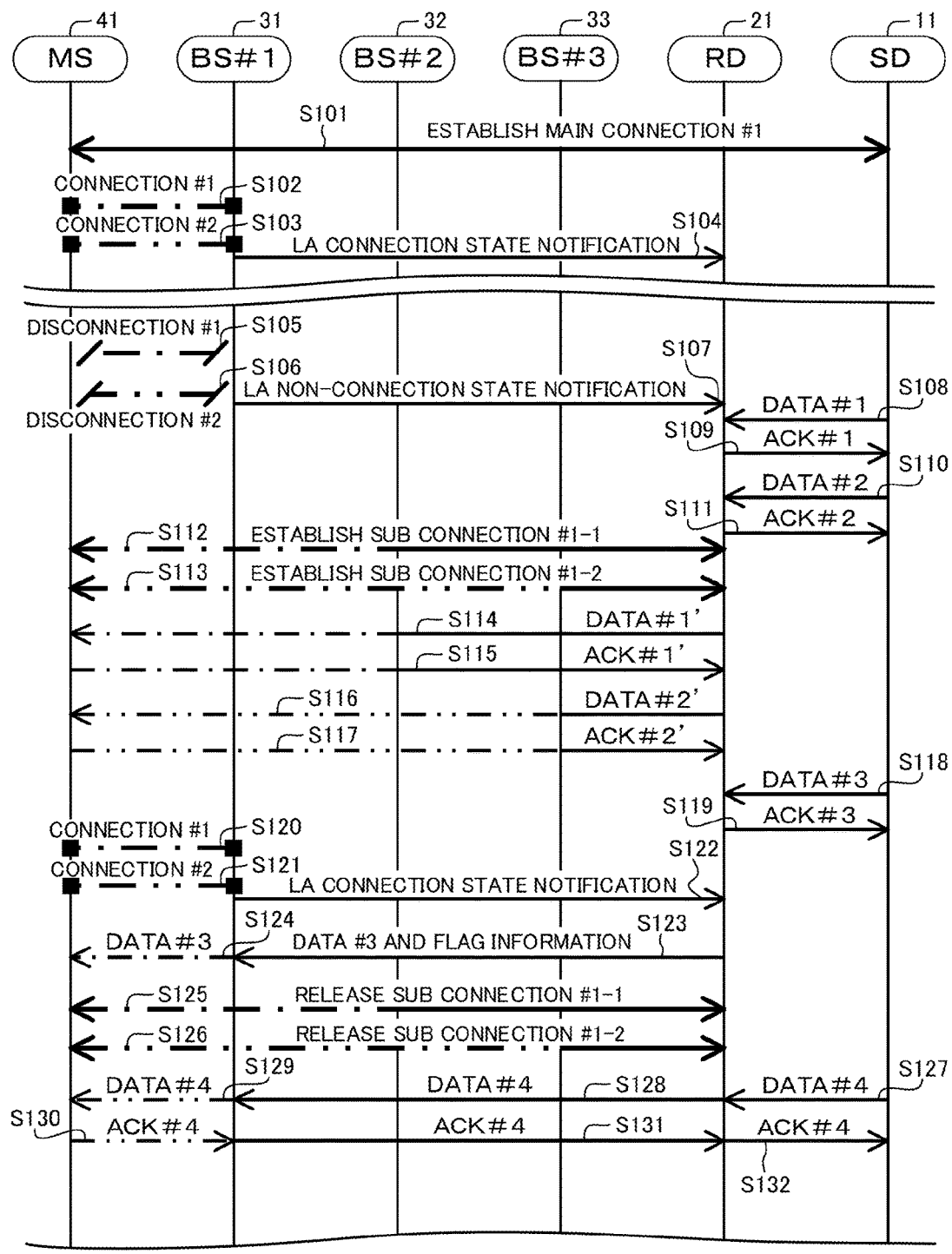
FIG. 12 is a sequence diagram illustrating an example of operation of the wireless communication system according to the first embodiment.
Figure 13:
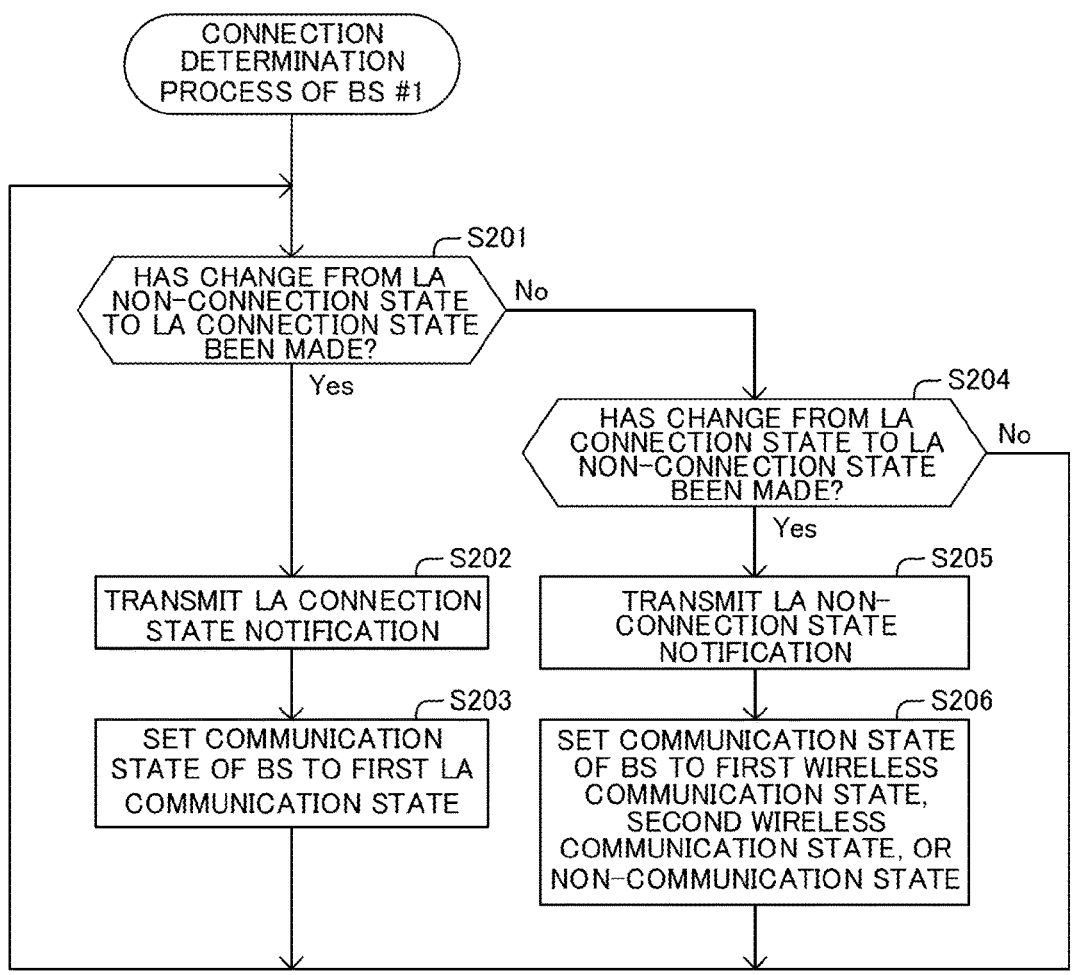
FIG. 13 is a flowchart illustrating an example of connection determination process executed by the base station #1 according to the first embodiment.

The base station #1 executes a connection determination process illustrated in a flowchart of FIG. 13. Specifically, the base station #1 determines whether or not the state of the base station #1 has changed from the LA non-connection state to the LA connection state (step S201 in FIG. 13). According to the above assumption, the base station #1 determines "Yes", and transmits the LA connection state notification to the relay device 21 (step S202 in FIG. 13 and step S104 in FIG. 12).

Then, the base station #1 sets the communication state of the base station #1 to the first LA communication state (step S203 in FIG. 13). Specifically, the base station #1 changes the communication state information stored in the storage device 312 to information representing the first LA communication state. This similarly applies even when the base station #1 sets the communication state of the base station #1 to any other communication state. Thereafter, the base station #1 returns to step S201 in FIG. 13, and repeatedly executes the process of step S201 to step S206. The process of step S204 to step S206 will be described later.

Figure 14:
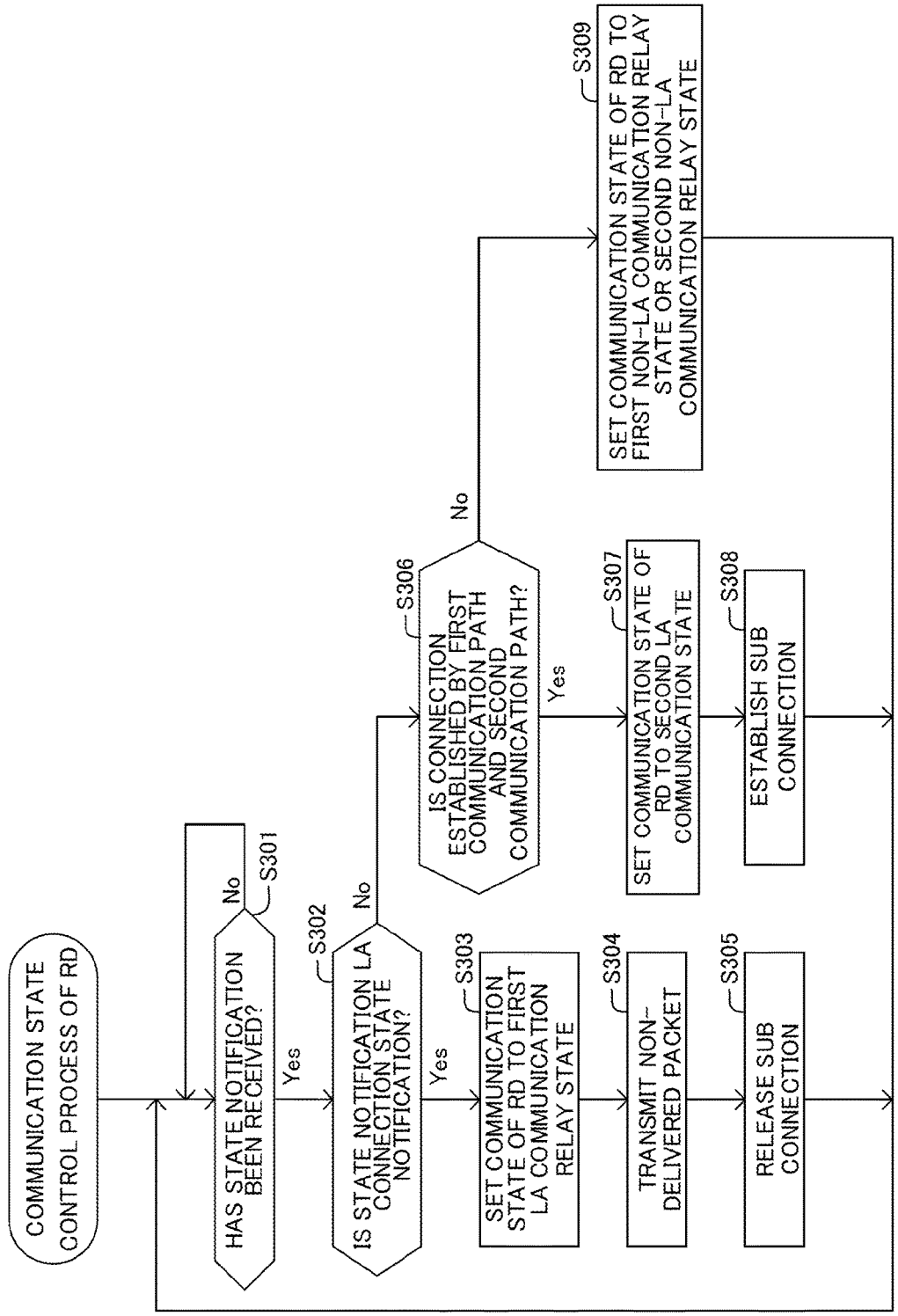
FIG. 14 is a flowchart illustrating an example of communication state control process executed by the relay device according to the first embodiment.

Meanwhile, the relay device 21 executes a communication state control process illustrated in a flowchart of FIG. 14. Specifically, the relay device 21 determines whether or not the state notification (in this example, the LA connection state notification or the LA non-connection state notification) has received from the base station #1 (step S301 in FIG. 14).

According to the above assumption, the relay device 21 determines "Yes", and determines whether or not the received state notification is the LA connection state notification (step S302 in FIG. 14). According to the above assumption, the relay device 21 determines "Yes", and sets the communication state of the relay device 21 to the first LA communication relay state (step S303 in FIG. 14). Specifically, the relay device 21 changes the communication state information stored in the storage device 212 to information representing the first LA communication relay state. This similarly applies even when the relay device 21 sets the communication state of the relay device 21 to any other communication state.

Then, when there is a non-delivered packet, the relay device 21 transmits the non-delivered packet to the base station #1 (step S304 in FIG. 14). According to the above assumption, at this point in time, there is no non-delivered packet, and thus the relay device 21 does not transmit the non-delivered packet. Then, when the sub connection is established, the relay device 21 releases the sub connection (step S305 in FIG. 14). According to the above assumption, at this point in time, the sub connection is not established, and thus the relay device 21 does not release the sub connection. Thereafter, the relay device 21 returns to step S301 in FIG. 14, and repeatedly executes the process of step S301 to step S309. The process of step S306 to step S309 will be described later.

Thereafter, the mobile station 41 is assumed to be arranged at a position that is not included in the first cell and the second cell but included in both a third cell and a fourth cell before the relay device 21 receives packets from the server device 11. In this example, the third cell is an area in which radio resources used to perform the first wireless communication according to the first wireless communication scheme are provided by the base station #2. Similarly, the fourth cell is an area in which radio resources used to perform the second wireless communication according to the second wireless communication scheme are provided by the base station #3.

In this case, the connection #1 between the mobile station 41 and the base station #1 is disconnected (step S105 in FIG. 12). This disconnection is also referred to as a "disconnection #1". Similarly, the connection #2 between the mobile station 41 and the base station #1 is disconnected (step S106 in FIG. 12). This disconnection is also referred to as a "disconnection #2".

Meanwhile, the mobile station 41 is connected to the base station #2 so that the first wireless communication according to the first wireless communication scheme is executable. Similarly, the mobile station 41 is connected to the base station #3 so that the second wireless communication according to the second wireless communication scheme is executable.

At this point in time, when the base station #1 proceeds to step S201 in FIG. 13, the base station #1 determines "No", and determines whether or not the state of the base station #1 has changed from the LA connection state to the LA non-connection state (step S204 in FIG. 13). According to the above assumption, the base station #1 determines "Yes", and transmits the LA non-connection state notification to the relay device 21 (step S205 in FIG. 13 and step S107 in FIG. 12).

Then, the base station #1 sets the communication state of the base station #1 to the first wireless communication state, the second wireless communication state, or the non-communication state (step S206 in FIG. 13). Specifically, when the state of the base station #1 is the first connection state, the base station #1 sets the communication state of the base station #1 to the first wireless communication state. Similarly, when the state of the base station #1 is the second connection state, the base station #1 sets the communication state of the base station #1 to the second wireless communication state. When the state of the base station #1 is neither the first connection state nor the second connection state, the base station #1 sets the communication state of the base station #1 to the non-communication state.

According to the above assumption, at this point in time, the base station #1 sets the communication state of the base station #1 to the non-communication state. Thereafter, the base station #1 returns to step S201 in FIG. 13.

At this point in time, when the relay device 21 proceeds to step S302 in FIG. 14, the relay device 21 determines "No", and determines whether or not the relay device 21 and the mobile station 41 are connected to communicate through each of the first communication path and the second communication path (step S306 in FIG. 14). According to the above assumption, the relay device 21 determines "Yes", and sets the communication state of the relay device 21 to the second LA communication state (step S307 in FIG. 14).

Then, the relay device 21 establishes two sub connections #1-1 and #1-2 with the mobile station 41 according to the communication protocol (in this example, the TCP) (step S308 in FIG. 14 and steps S112 and S113 in FIG. 12). According to the above assumption, the sub connection #1-1 is established in the first communication path via the base station #2. Similarly, the sub connection #1-2 is established in the second communication path via the base station #3.

In this example, the relay device 21 establishes the sub connection after packets are received from the server device 11. The relay device 21 may establish the sub connection before packets are received from the server device 11.

Then, the relay device 21 returns to step S301 in FIG. 14.

Thereafter, packets in which the mobile station 41 is set as the destination are assumed to be transmitted from the server device 11 to the relay device 21 through the main connection. In this example, the packets are also referred to as "DATA#i". Here, i is a natural number.

Figure 15:
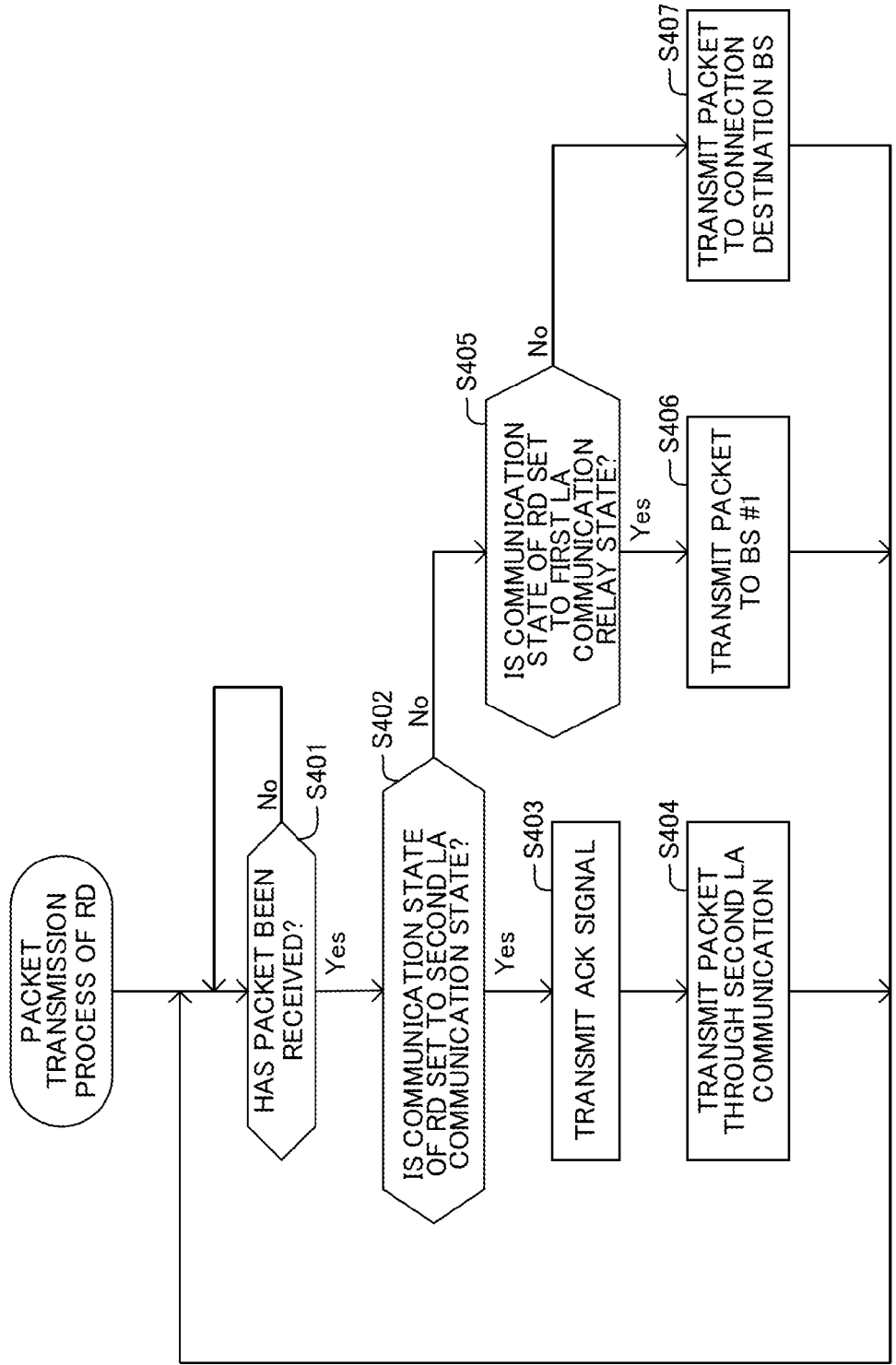
FIG. 15 is a flowchart illustrating an example of packet transmission process executed by the relay device according to the first embodiment.

The relay device 21 executes a packets transmission process illustrated in a flowchart of FIG. 15. Specifically, the relay device 21 determines whether or not packets have been received from the server device 11 (step S401 in FIG. 15). According to the above assumption, the relay device 21 receives the packets (DATA#1) from the server device 11 (step S108 in FIG. 12).

Thus, the relay device 21 determines "Yes", and determines whether or not the communication state of the relay device 21 is set to the second LA communication state (step S402 in FIG. 15). At this point in time, the communication state of the relay device 21 is set to the second LA communication state. Thus, the relay device 21 determines "Yes", and transmits an ACK signal (ACK#1) to the transmission source (in this example, the server device 11) set to the received packets (step S403 in FIG. 15 and step S109 in FIG. 12). In this example, the ACK signal is also referred to as "ACK#i".

Then, the relay device 21 transmits the received packets to the mobile station 41 through the second LA communication (step S404 in FIG. 15). Specifically, the relay device 21 causes the first buffer and the second buffer to store the packets so that the received packets are distributed to the first buffer and the second buffer. Here, the relay device 21 is assumed to cause the first buffer to store the packets (DATA#1).

Then, the relay device 21 returns to step S401 in FIG. 15, and repeatedly executes the process of step S401 to step S407. The process of step S405 to step S407 will be described later.

Similarly, when packets (DATA#2) are received from the server device 11 (step S110 in FIG. 12), the relay device 21 transmits an ACK signal (ACK#2) to the transmission source (in this example, the server device 11) set to the packets (step S111 in FIG. 12). Here, the relay device 21 is assumed to cause the second buffer to store the packets (DATA#2).

Then, the relay device 21 transmits the packets (DATA#1) stored in the first buffer to the mobile station 41 using the sub connection #1-1 (i.e., via the sub connection #1-1) (step S114 in FIG. 12). In this example, packets in the sub connection are also referred to as "DATA#i'". The ACK signal in the sub connection is also referred to as "ACK#i'".

Figure 16:
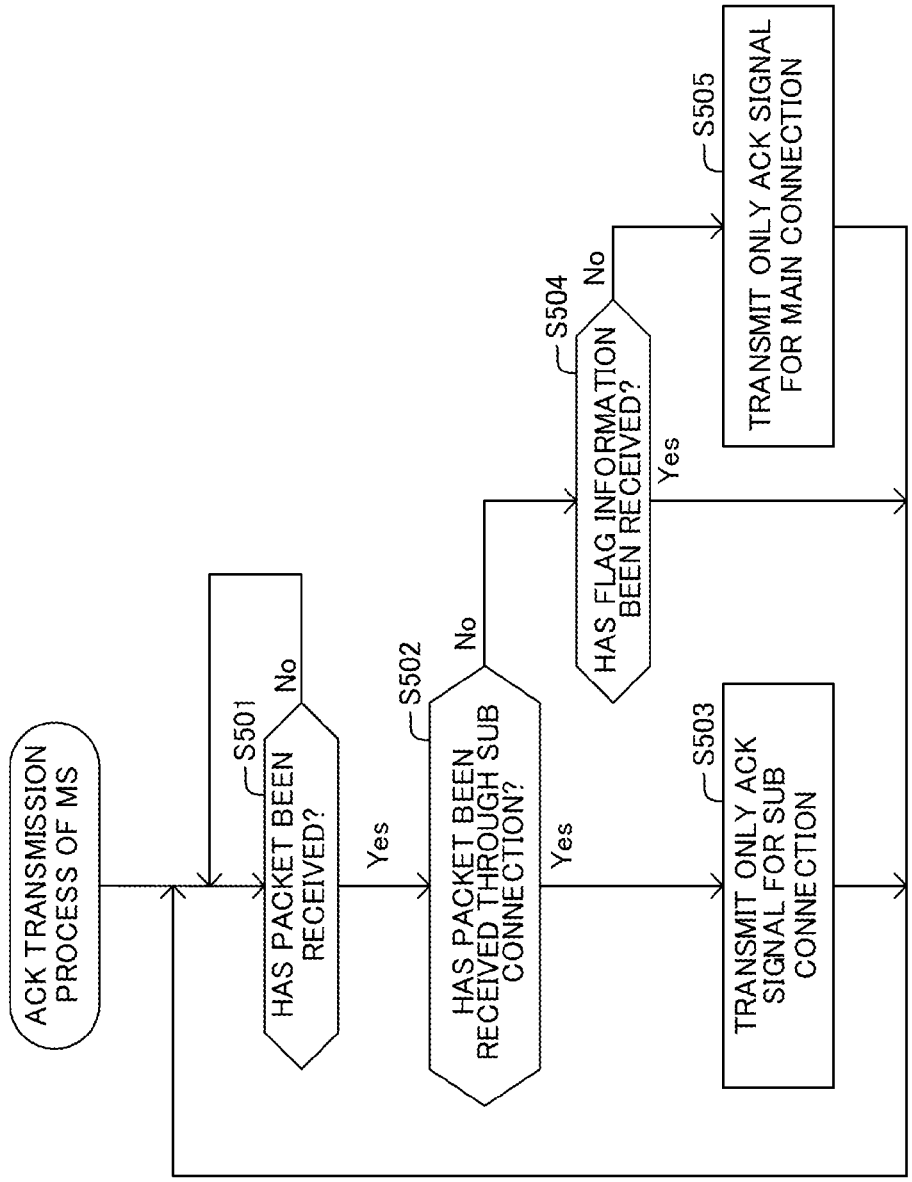
FIG. 16 is a flowchart illustrating an example of ACK transmission process executed by the mobile station according to the first embodiment.

The mobile station 41 executes an ACK transmission process illustrated of FIG. 16. Specifically, the mobile station 41 determines whether or not packets have been received from any one of the base stations #1, #2, and #3 (step S501 in FIG. 16). According to the above assumption, the mobile station 41 receives the packets DATA#1' through the sub connection #1-1 (i.e., through the base station #2).

Thus, the mobile station 41 determines "Yes", and determines whether or not packets have been received through the sub connection (step S502 in FIG. 16). At this point in time, the mobile station 41 determines "Yes", and transmits the ACK signal (ACK#1') for the sub connection #1-1 (step S503 in FIG. 16 and step S115 in FIG. 12). Specifically, the mobile station 41 transmits the ACK signal (ACK#1') to the transmission source (in this example, the relay device 21) set in the header for the sub connection #1-1 through the sub connection #1-1.

Thereafter, the mobile station 41 returns to step S501 in FIG. 16, and repeatedly executes the process of step S501 to step S505. The process of step S504 to step S505 will be described later.

Similarly, the relay device 21 transmits the packets (DATA#2) stored in the second buffer to the mobile station 41 using the sub connection #1-2 (step S116 in FIG. 12). Then, the mobile station 41 transmits the ACK signal (ACK#2') for the sub connection #1-2 (step S117 in FIG. 12). Specifically, the mobile station 41 transmits the ACK signal (ACK#2') to the transmission source (in this example, the relay device 21) set in the header for the sub connection #1-2 through the sub connection #1-2.

Then, the relay device 21 receives packets (DATA#3) from the server device 11 (step S118 in FIG. 12). As a result, the relay device 21 transmits the ACK signal (ACK#3) to the transmission source (in this example, the server device 11) set to the received packets (step S119 in FIG. 12).

Thereafter, the mobile station 41 is assumed to be arranged at a position included in both the first cell and the second cell before the relay device 21 transmits the packets (DATA#3) to the mobile station 41.

In this case, the mobile station 41 is connected to the base station #1 so that the first wireless communication according to the first wireless communication scheme is executable (step S120 in FIG. 12). Further, the mobile station 41 is connected to the base station #1 so that the second wireless communication according to the second wireless communication scheme is executable (step S121 in FIG. 12). As a result, the state of the base station #1 becomes the first connection state and the second connection state. Thus, the base station #1 transmits the LA connection state notification to the relay device 21 (step S122 in FIG. 12).

At this point in time, when the relay device 21 proceeds to step S304 in FIG. 14, there are non-delivered packets. In other words, the first buffer or the second buffer are storing the packets (DATA#3) in which the mobile station 41 is set as the destination. The packets are packets (i.e., non-delivered packets), for which the ACK signal (the acknowledge response) have not received from the mobile station 41, held to be transmitted to the mobile station 41. Thus, the relay device 21 transmits (transfers) the non-delivered packets (DATA#3) to the base station #1 together with the flag information (step S304 in FIG. 14 and step S123 in FIG. 12).

When the non-delivered packets transmitted by the relay device 21 have been received, the base station #1 transmits the non-delivered packets to the mobile station 41 together with the flag information by executing the first LA communication (step S124 in FIG. 12).

At this point in time, when the mobile station 41 proceeds to step S502 in FIG. 16, the mobile station 41 determines "No", and determines whether or not the flag information has been received together with the packets (step S504 in FIG. 16). According to the above assumption, the mobile station 41 determines "Yes", and returns to step S501 without transmitting the ACK signal.

Further, at this point in time, the sub connections #1-1 and #1-2 are established. Thus, when the relay device 21 proceeds to step S305 in FIG. 14, the relay device 21 releases the established sub connections #1-1 and #1-2 (step S305 in FIG. 14 and steps S125 and S126 in FIG. 12).

Then, the relay device 21 receives packets (DATA#4) from the server device 11 (step S127 in FIG. 12). At this point in time, when the relay device 21 proceeds to step S402 in FIG. 15, the relay device 21 determines "No", and determines whether or not the communication state of the relay device 21 is set to the first LA communication relay state (step S405 in FIG. 15). At this point in time, the communication state of the relay device 21 is set to the first LA communication relay state. Thus, the relay device 21 determines "Yes", and transmits the received packets (DATA#4) to the base station #1 (step S406 in FIG. 15 and step S128 in FIG. 12). Thereafter, the relay device 21 returns to step S401 in FIG. 15.

Figure 17:
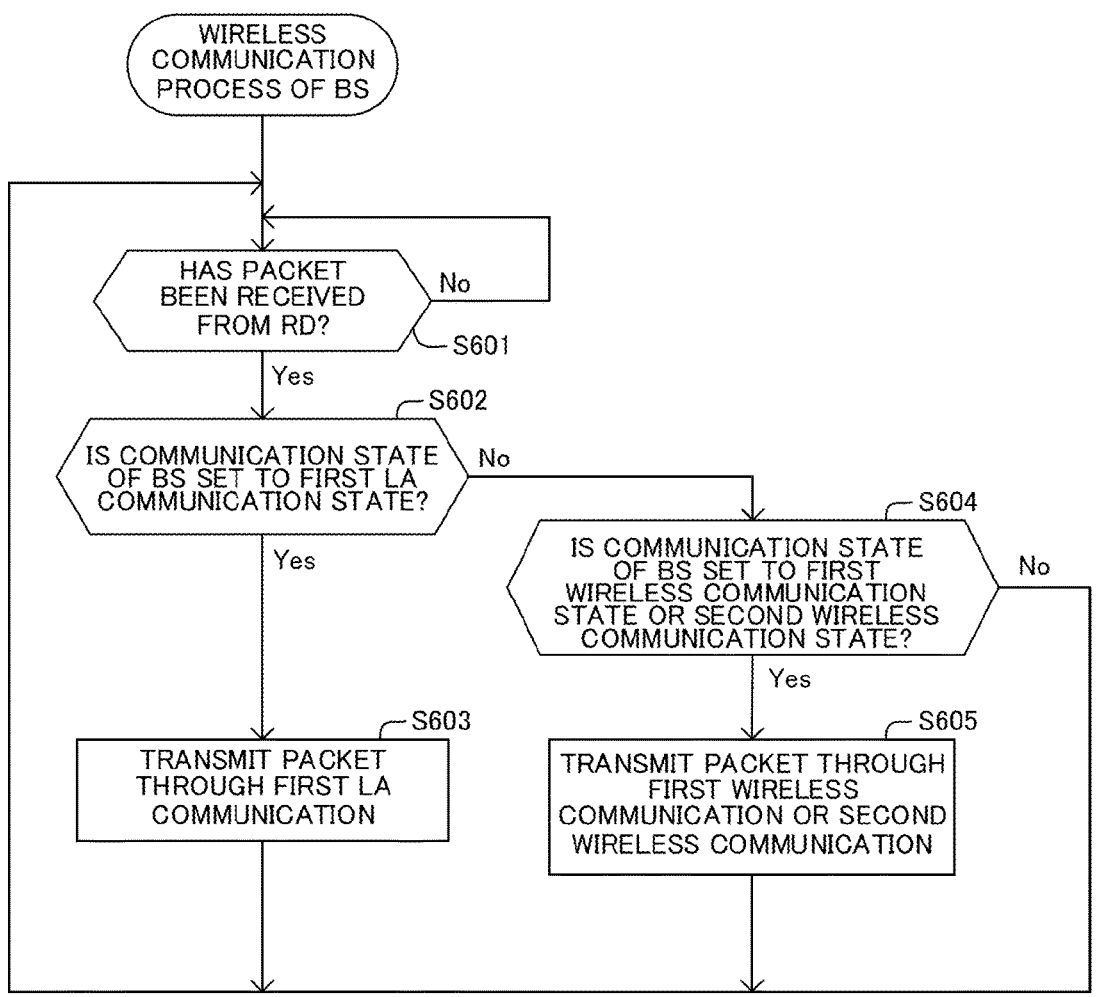
FIG. 17 is a flowchart illustrating an example of wireless communication process executed by the base station #1 according to the first embodiment.

The base station #1 executes a wireless communication process illustrated in a flowchart of FIG. 17. Specifically, the base station #1 determines whether or not packets have been received from the relay device 21 (step S601 in FIG. 17). According to the above assumption, the base station #1 determines "Yes", and determines whether or not the communication state of the base station #1 is set to the first LA communication state (step S602 in FIG. 17).

At this point in time, the communication state of the base station #1 is set to the first LA communication state. Thus, the base station #1 determines "Yes", and transmits the received packets (DATA#4) to the mobile station 41 through the first LA communication (step S603 in FIG. 17 and step S129 in FIG. 12). Thereafter, the base station #1 returns to step S601 in FIG. 17, and repeatedly executes the process of step S601 to step S605. The process of step S604 to step S605 will be described later.

As a result, the mobile station 41 receives the packets (DATA#4) from the base station #1. At this point in time, when the mobile station 41 proceeds to step S504 in FIG. 16, the mobile station 41 determines "No", and transmits the ACK signal (ACK#4) for the main connection #1 (step S505 in FIG. 16 and step S130 in FIG. 12). Specifically, the mobile station 41 transmits the ACK signal (ACK#4) to the transmission source (in this example, the server device 11) set in the header for the main connection #1 through the main connection #1. Thereafter, the mobile station 41 returns to step S501 in FIG. 16.

The base station #1 relays (transfers) the ACK signal (ACK#4) received from the mobile station 41 to the relay device 21 (step S131 in FIG. 12). The relay device 21 relays the ACK signal received from the base station #1 to the server device 11 (step S132 in FIG. 12).

When the relay device 21 proceeds to step S306 in FIG. 14, the relay device 21 determines "No" when the relay device 21 and the mobile station 41 are connected to communicate through only either the first communication path or the second communication path. In this case, the relay device 21 sets the communication state of the relay device 21 to the first non-LA communication relay state or the second non-LA communication relay state (step S309 in FIG. 14).

Specifically, when the relay device 21 and the mobile station 41 are connected to communicate through only the first communication path, the relay device 21 sets the communication state of the relay device 21 to the first non-LA communication relay state. When the relay device 21 and the mobile station 41 are connected to communicate through only the second communication path, the relay device 21 sets the communication state of the relay device 21 to the second non-LA communication relay state.

Thereafter, the relay device 21 returns to step S301 in FIG. 14.

When the relay device 21 proceeds to step S405 in FIG. 15, the relay device 21 determines "No" when the communication state of the relay device 21 is not set to the first LA communication relay state. In this case, the relay device 21 transmits the received packets to a connection destination base station (a connection destination BS) (step S407 in FIG. 15). The connection destination base station is the base station #1, #2, or #3 with which the mobile station 41 is connected to communicate. In this case, the connection destination base station transmits the packets received from the relay device 21 to the mobile station 41.

Thereafter, the relay device 21 returns to step S401 in FIG. 15.

When the base station #1 proceeds to step S602 in FIG. 17, the base station #1 determines "No" when the communication state of the base station #1 is not set to the first LA communication state. In this case, the base station #1 determines whether or not the communication state of the base station #1 is set to the first wireless communication state or the second wireless communication state (step S604 in FIG. 17).

Then, when the communication state of the base station #1 is set to the first wireless communication state or the second wireless communication state, the base station #1 determines "Yes". Then, the base station #1 transmits the received packets to the mobile station 41 through the first wireless communication or the second wireless communication (step S605 in FIG. 17).

Specifically, when the communication state of the base station #1 is set to the first wireless communication state, the base station #1 transmits the packets through the first wireless communication. Similarly, when the communication state of the base station #1 is set to the second wireless communication state, the base station #1 transmits the packets through the second wireless communication. Thereafter, the base station #1 returns to step S601 in FIG. 17.

When the communication state of the base station #1 is set to the non-communication state, the base station #1 determines "No" in step S604 in FIG. 17. In this case, the base station #1 returns to step S601 in FIG. 17 without transmitting the packets.

In the above operation, the mobile station 41 is assumed to be arranged at a position included in both the third cell and the fourth cell after the mobile station 41 is arranged at a position included in both the first cell and the second cell. Meanwhile, even when the mobile station 41 is not arranged at a position included in both the first cell and the second cell but arranged at a position included in both the third cell and the fourth cell, the wireless communication system 1 performs an operation similar to the operation of the above example.

Specifically, the wireless communication system 1 executes a process obtained by omitting the process of step S102 to step S107 from the process illustrated in FIG. 12. In this case, it is preferable that the same information as when the process of step S107 in FIG. 12 ends be set in advance as information stored in the initial state.

As described above, according to the wireless communication system 1 according to the first embodiment, when the state of the base station #1 is determined to be the LA connection state, the base station #1 transmits the state notification (the LA connection state notification) representing that the state of the base station #1 is the LA connection state to the relay device 21. Further, in this case, the base station #1 controls the base station #1 such that the first LA communication is executed. In addition, when the LA connection state notification is received from the base station #1, the relay device 21 controls the relay device 21 such that the second LA communication is not executed.

Thus, when the state of the base station #1 is the LA connection state, the LA connection state notification is transmitted from the base station #1 to the relay device 21. As a result, the relay device 21 can recognize that the base station #1 can execute the first LA communication with the mobile station 41. Further, in this case, the relay device 21 does not execute the second LA communication. Meanwhile, the base station #1 executes the first LA communication.

Thus, for example, when both the first LA communication by the base station #1 and the second LA communication by the relay device 21 are executable, the wireless communication system 1 may execute only the first LA communication. As a result, it is possible to increase the throughput that is an amount of data to be transmitted to the mobile station 41 per unit time compared to when the wireless communication system 1 executes the second LA communication.

According to the wireless communication system 1 according to the first embodiment, when the state of the base station #1 is determined to be not the LA connection state, the base station #1 transmits the state notification (the LA non-connection state notification) representing that the state of the base station #1 is not the LA connection state to the relay device 21. Further, in this case, the base station #1 controls the base station #1 such that the first LA communication is not executed. In addition, when the LA non-connection state notification is received from the base station #1, the relay device 21 controls the relay device 21 such that the second LA communication is executed.

Thus, when the state of the base station #1 is not the LA connection state, the LA non-connection state notification is transmitted from the base station #1 to the relay device 21. Accordingly, the relay device 21 can recognize that the base station #1 hardly executes the first LA communication with the mobile station 41. Further, in this case, the relay device 21 executes the second LA communication.

Thus, for example, when the state of the wireless communication system 1 has changed from the state in which the first LA communication by the base station #1 is executable to the state in which the first LA communication by the base station #1 is inexecutable, the wireless communication system 1 can promptly execute the second LA communication. As a result, it is possible to increase the throughput to be higher than when the wireless communication system 1 does not execute the second LA communication.

According to the wireless communication system 1 according to the first embodiment, when the LA connection state notification is received from the base station #1 while the second LA communication is being executed, the relay device 21 transfers the non-delivered packets to the base station #1. Further, the base station #1 transmits the non-delivered packets transferred from the relay device 21 to the mobile station 41 by executing the first LA communication.

Thus, even when the state of the wireless communication system 1 has switched from the state in which the second LA communication is executed to the state in which the first LA communication is executed, it is possible to reliably transmits packets, that are scheduled to be transmitted to the mobile station 41, to the mobile station 41.

Particularly, in the congestion control in the TCP, when a packet loss is large, the transmission rate is relatively significantly lowered. Thus, the throughput relatively significantly deteriorates. On the other hand, according to the wireless communication system 1 according to the first embodiment, it is possible to prevent the non-delivered packets from being lost, and thus it is possible to more reliably improve the throughput.

According to the wireless communication system 1 according to the first embodiment, when packets in which the mobile station 41 is set as the destination are received while the second LA communication is being executed, the relay device 21 transmits the acknowledge response to the transmission source set to the packets. Further, the base station #1 transmits the non-delivered packets to the mobile station 41 together with the flag information. In addition, the mobile station 41 does not transmit the acknowledge response to the outside when packets have been received through the first LA communication and the flag information has been received together with the packets, and when packets have been received through the second LA communication. Further, when packets have been received through the first LA communication but the flag information has not been received together with the packets, the mobile station 41 transmits the acknowledge response to the transmission source set to the packets.

Thus, the wireless communication system 1 can promptly transmit the acknowledge response to the transmission source set to the packets. As a result, it is possible to prevent the throughput between the transmission source and the relay device 21 from being wastefully decreased.

Further, it is possible to prevent the mobile station 41 from transmitting the acknowledge response to the packets in which the acknowledge response has been already transmitted by the relay device 21. As a result, it is possible to prevent the communication band of the wireless communication path between the mobile station 41 and the base station #1 from being wastefully decreased.

According to the wireless communication system 1 according to the first embodiment, the relay device 21 executes the second LA communication using connections established according to a certain communication protocol as a plurality of communication paths connecting the relay device 21 with the mobile station 41. Further, when the LA connection state notification is received from the base station #1 while the second LA communication is being executed, the relay device 21 releases the established connection.

Thus, when the state of the wireless communication system 1 has been switched from the state in which the second LA communication is executed to the state in which the first LA communication is executed, it is possible to prevent the state in which the connection is established from being wastefully continued.

<Second Embodiment>

Next, a wireless communication system according to a second embodiment of the present invention will be described. The wireless communication system according to the second embodiment differs from the wireless communication system according to the first embodiment in that when the state of the base station is determined to be not the LA connection state while the base station is executing the first LA communication, the non-delivered packets are transferred to the relay device. The following description will proceed with this difference. In the description of the second embodiment, the same components as in the first embodiment are denoted by the same reference numerals.

(Function)

Figure 18:
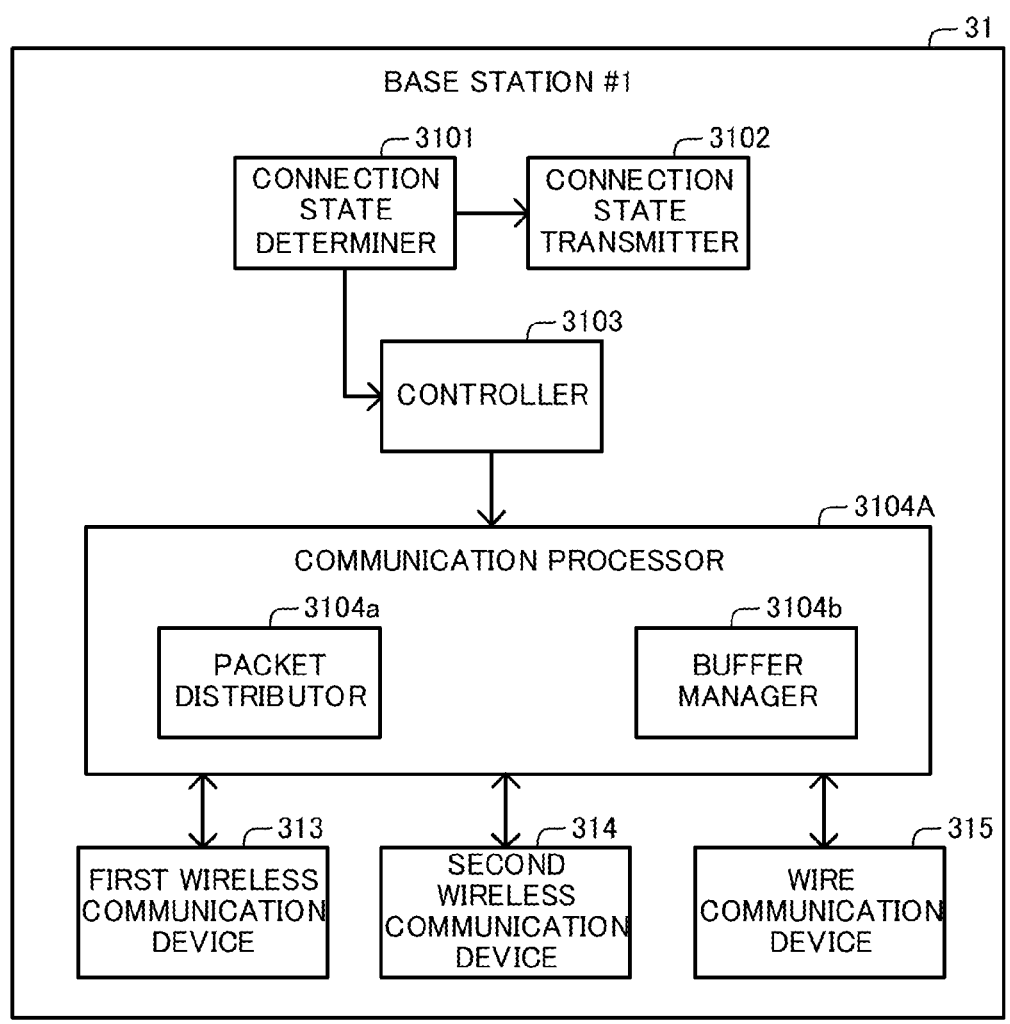
FIG. 18 is a block diagram illustrating an example of function of a base station #1 according to a second embodiment.

As illustrated in FIG. 18, a function of the base station #1 according to the second embodiment includes a communication processor (a first transferor) 3104A instead of the communication processor 3104.

The communication processor 3104A has the same function as the communication processor 3104. Further, the communication processor 3104A includes a buffer manager 3104b.

The buffer manager 3104b manages third buffer and fourth buffer that temporarily store packets to be transmitted through the first LA communication. The third buffer temporarily stores packets to be transmitted through the first wireless communication. Similarly, the fourth buffer temporarily stores packets to be transmitted through the second wireless communication. Each of the third buffer and fourth buffer is configured with the storage device 312.

The buffer manager 3104b outputs the packets stored in the third buffer to the first wireless communication device 313. Similarly, the buffer manager 3104b outputs the packets stored in the fourth buffer to the second wireless communication device 314.

The buffer manager 3104b deletes (erases) at least one packet correctly received by the mobile station 41 among output packets from the third buffer and the fourth buffer. In this example, the buffer manager 3104b receives the acknowledge response transmitted from the mobile station 41 to the server device 11. As a result, the buffer manager 3104b recognizes that the packets have been correctly received by the mobile station 41. The buffer manager 3104b may recognize that all the packets output to the first wireless communication device 313 or the second wireless communication device 314 have been correctly received by the mobile station 41.

In the first LA communication state, the communication processor 3104A transfers (transmits) the non-delivered packets to the relay device 21 when the state of the base station #1 is determined to be not the LA connection state. The non-delivered packets are packets, in which the mobile station 41 is set as the destination, stored in the third buffer and the fourth buffer among packets received from the server device 11. In other words, the non-delivered packets are packets that have not been correctly received by the mobile station 41 and held to be transmitted to the mobile station 41.

Figure 19:
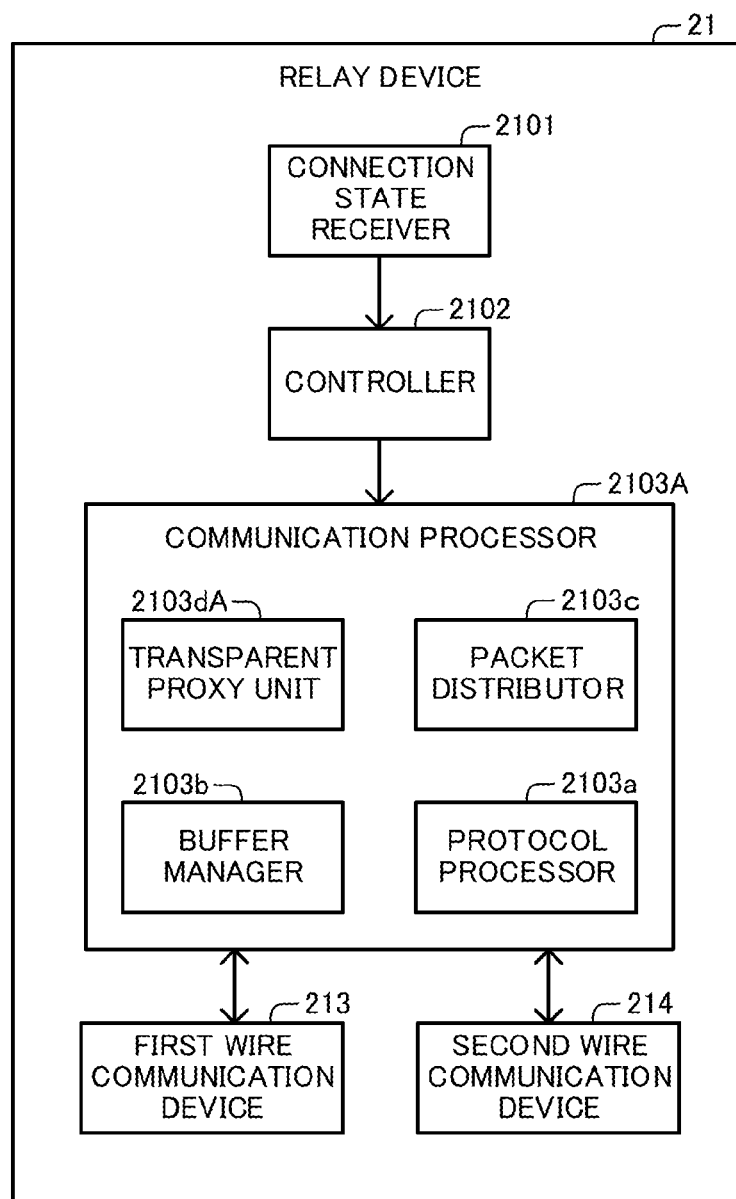
FIG. 19 is a block diagram illustrating an example of function of a relay device according to the second embodiment.

As illustrated in FIG. 19, a function of the relay device 21 according to the second embodiment includes a communication processor (a second communicator) 2103A instead of the communication processor 2103. The communication processor 2103A has a function similar to that of the communication processor 2103 except that a transparent proxy unit (a second transmitter) 2103dA is provided instead of the transparent proxy unit 2103d.

Further, when the non-delivered packets transferred by the base station #1 have been received, the communication processor 2103A transmits the non-delivered packets to the mobile station 41 by executing the second LA communication.

The transparent proxy unit 2103dA has the same function as the transparent proxy unit 2103d. Further, when packets serving as the non-delivered packets are received from the base station #1, the transparent proxy unit 2103dA transmits the acknowledge response to the transmission source (e.g., the server device 11) set to the packets. The acknowledge response is information representing that the packets have been correctly received by the mobile station 41. In this example, the transparent proxy unit 2103dA transmits an ACK signal as the acknowledge response. The ACK signal is transmitted by the relay device 21 instead of the mobile station 41 set as the destination of the packets and thus also called as a pseudo ACK signal.

(Operation)

Next, an operation of the wireless communication system 1 according to the second embodiment will be described with reference to FIGS. 20 and 21.

Figure 21:
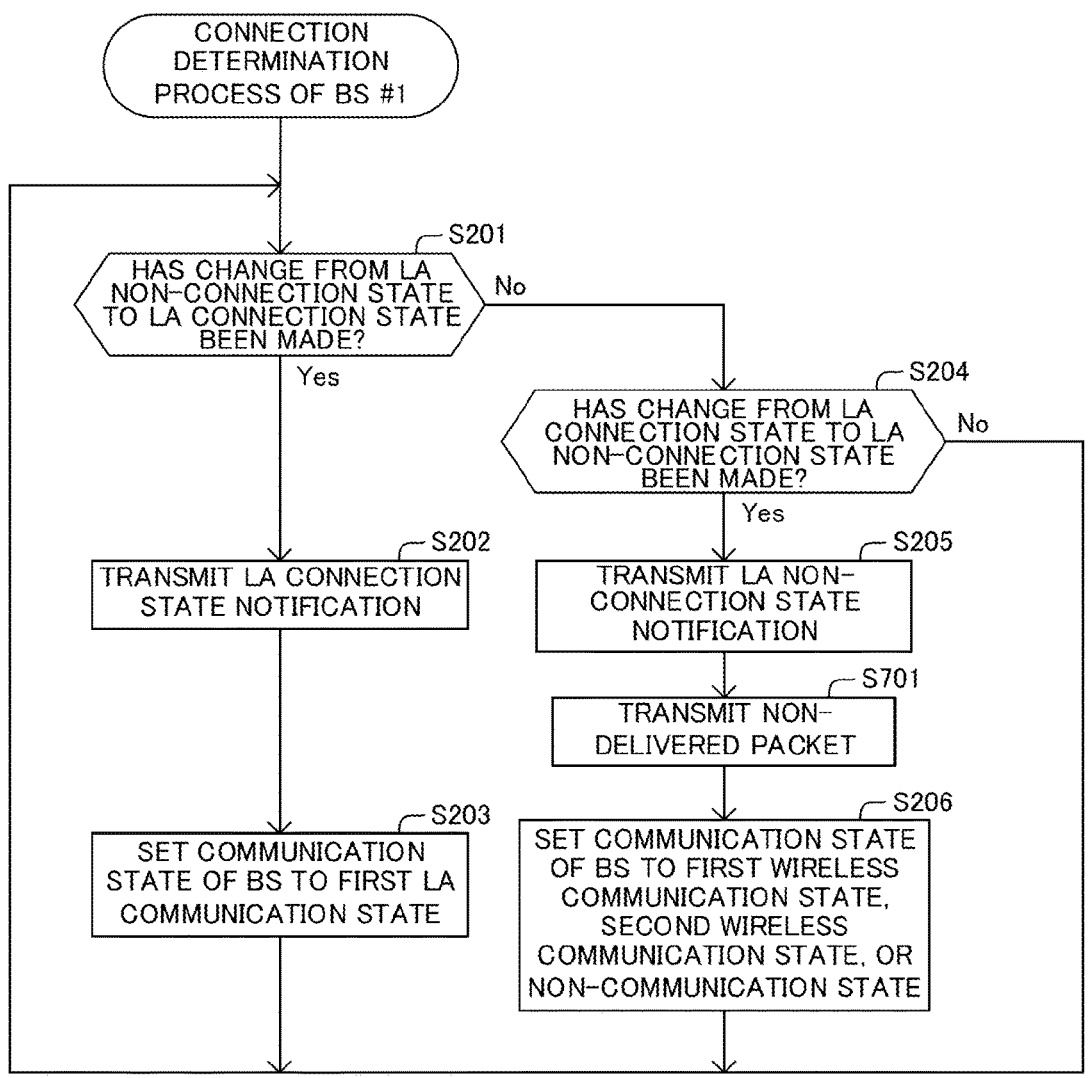
FIG. 21 is a flowchart illustrating an example of connection determination process executed by the base station #1 according to the second embodiment.

The base station #1 according to the second embodiment executes a connection determination process illustrated in a flowchart of FIG. 21 instead of the connection determination process illustrated in FIG. 13. The connection determination process illustrated in FIG. 21 is a process in which a process of step S701 is added between step S205 and step S206 in the connection determination process illustrated in FIG. 13.

The wireless communication system 1 according to the second embodiment executes the process illustrated in FIG. 12, similarly to the wireless communication system 1 according to the first embodiment. Thereafter, the relay device 21 receives packets (DATA#5) from the server device 11 (step S141 in FIG. 20). At this point in time, the communication state of the relay device 21 is set to the first LA communication relay state. Thus, the relay device 21 transmits the received packets (DATA#5) to the base station #1 (step S142 in FIG. 20).

At this point in time, the mobile station 41 is assumed to be arranged at a position that is not included in the first cell and the second cell but included in both the third cell and the fourth cell before the base station #1 transmits the packets (DATA#5) to the mobile station 41.

Figure 20:
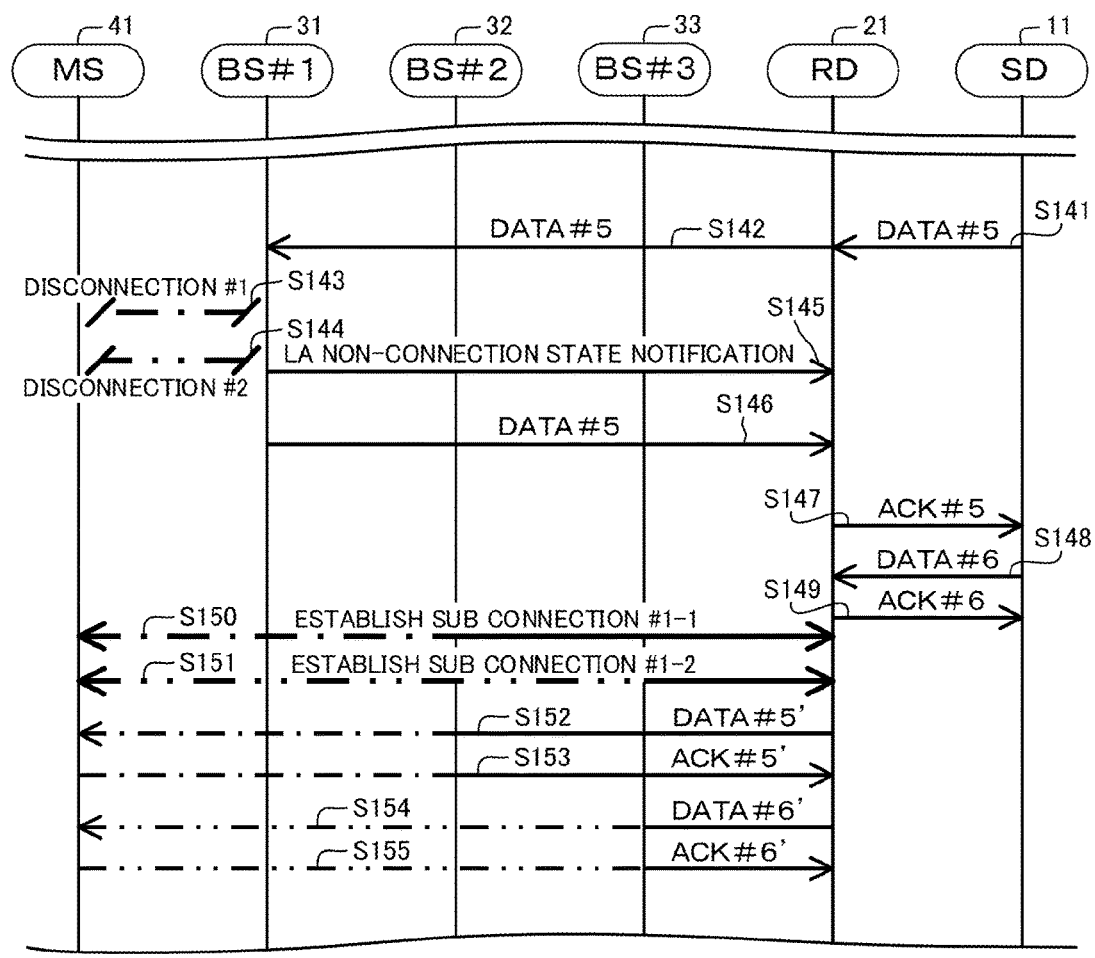
FIG. 20 is a sequence diagram illustrating an example of operation of a wireless communication system according to the second embodiment.

In this case, the connection #1 between the mobile station 41 and the base station #1 is disconnected (step S143 in FIG. 20). Similarly, the connection #2 between the mobile station 41 and the base station #1 is disconnected (step S144 in FIG. 20).

Meanwhile, the mobile station 41 is connected to the base station #2 so that the first wireless communication according to the first wireless communication scheme is executable. Similarly, the mobile station 41 is connected to the base station #3 so that the second wireless communication according to the second wireless communication scheme is executable.

At this point in time, when the base station #1 proceeds to step S201 in FIG. 21, the base station #1 determines "No", and determines whether or not the state of the base station #1 has changed from the LA connection state to the LA non-connection state (step S204 in FIG. 21). According to the above assumption, the base station #1 determines "Yes", and transmits the LA non-connection state notification to the relay device 21 (step S205 in FIG. 21 and step S145 in FIG. 20).

At this point in time, there are non-delivered packets. In other words, the third buffer or the fourth buffer stores the packets (DATA#5) in which the mobile station 41 is set as the destination. The packets are packets (i.e., the non-delivered packets), for which the ACK signal (the acknowledge response) has not been received from the mobile station 41, held to be transmitted to the mobile station 41. Thus, the base station #1 transmits (transfers) the non-delivered packets (DATA#5) to the relay device 21 (step S701 in FIG. 21 and step S146 in FIG. 20).

As a result, the relay device 21 receives the packets (DATA#5) from the base station #1. Thus, when the relay device 21 proceeds to step S401 in FIG. 15, the relay device 21 determines "Yes", and determines whether or not the communication state of the relay device 21 is set to the second LA communication state (step S402 in FIG. 15). At this point in time, the communication state of the relay device 21 is set to the second LA communication state. Thus, the relay device 21 determines "Yes", and transmits the ACK signal (ACK#5) to the transmission source (in this example, the server device 11) set to the received packets (step S403 in FIG. 15 and step S147 in FIG. 20).

Thereafter, the wireless communication system 1 executes step S148 to step S155 in FIG. 20, similarly to step S110 to step S117 in FIG. 12. As a result, the packets (DATA#5 and DATA#6) are transmitted from the relay device 21 to the mobile station 41 through the second LA communication.

As described above, the wireless communication system 1 according to the second embodiment can have the same operations and effects as the wireless communication system 1 according to the first embodiment.

Further, according to the wireless communication system 1 according to the second embodiment, when the state of the base station #1 is determined to be not the LA connection state while the first LA communication is being executed, the base station #1 transfers the non-delivered packets to the relay device 21. Further, the relay device 21 transmits the non-delivered packets transferred from the base station #1 to the mobile station 41 by executing the second LA communication.

Thus, even when the state of the wireless communication system 1 is switched from the state in which the first LA communication is executed to the state in which the second LA communication is executed, it is possible to reliably transmit packets, that are scheduled to be transmitted to the mobile station 41, to the mobile station 41.

Particularly, in the congestion control in the TCP, when a packet loss is large, the transmission rate is relatively significantly lowered. Thus, the throughput relatively significantly deteriorates. On the other hand, according to the wireless communication system 1 according to the second embodiment, it is possible to prevent the non-delivered packets from being lost, and thus it is possible to more reliably improve the throughput.

According to the wireless communication system 1 according to the second embodiment, when packets serving as the non-delivered packets are received from the base station #1, the relay device 21 transmits the acknowledge response to the transmission source set to the packets. Further, when the packets are received through the first LA communication, the mobile station 41 transmits the acknowledge response to the transmission source set to the packets. In addition, when packets have been received through the second LA communication, the mobile station 41 does not transmit the acknowledge response to the outside.

Thus, the wireless communication system 1 can promptly transmit the acknowledge response to the transmission source set to the packets. As a result, it is possible to prevent the throughput between the transmission source and the relay device 21 from being wastefully decreased.

Further, it is possible to prevent the mobile station 41 from transmitting the acknowledge response to the packets for which the acknowledge response has been already transmitted by the relay device 21. As a result, it is possible to prevent the communication band of the wireless communication path between the mobile station 41 and the base station #1 from being wastefully decreased.

<Third Embodiment>

Next, a wireless communication system according to a third embodiment of the present invention will be described. The wireless communication system according to the third embodiment differs from the wireless communication system according to the first embodiment in that the non-delivered packets are transmitted to the mobile station through the first sub connection. The following description will proceed with this difference. In the description of the third embodiment, the same components as in the first embodiment are denoted by the same reference numerals.

(Function)

Figure 22:
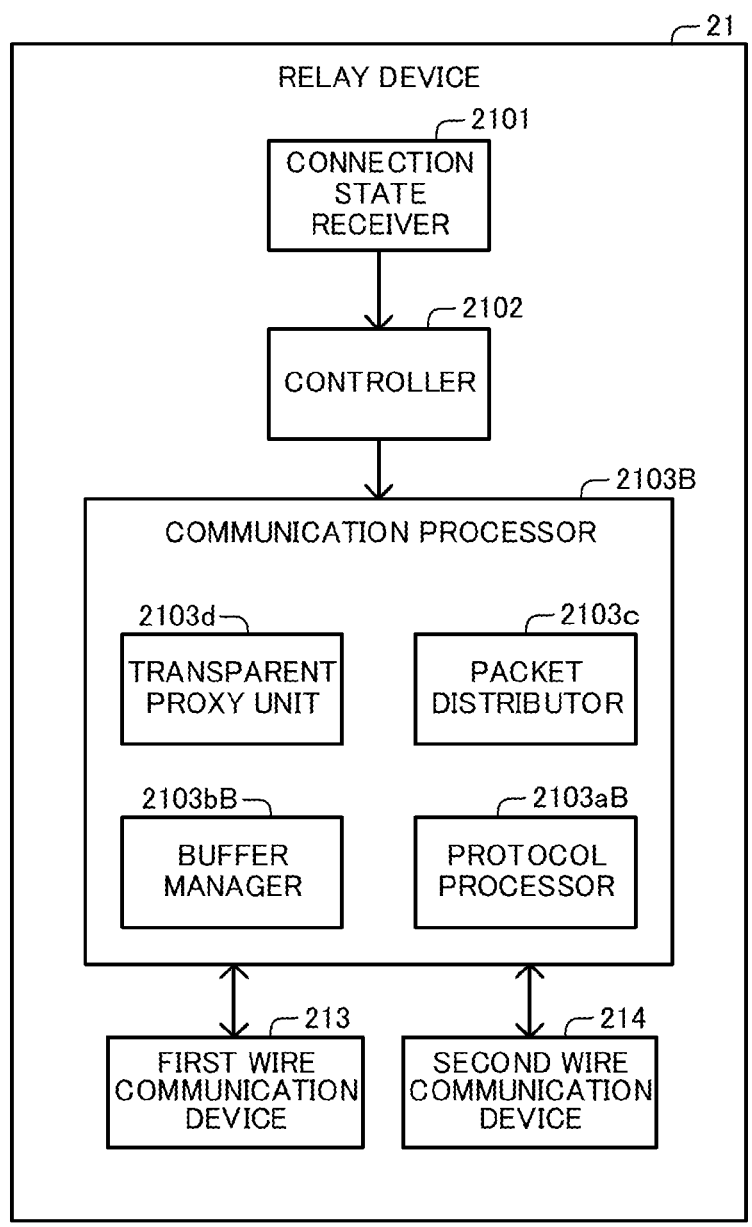
FIG. 22 is a block diagram illustrating an example of function of a relay device according to a third embodiment.

As illustrated in FIG. 22, a function of the relay device 21 according to the third embodiment includes a communication processor (a second communicator) 2103B instead of the communication processor 2103.

The communication processor 2103B has a function similar to that of the communication processor 2103 except that a protocol processor 2103aB is provided instead of the protocol processor 2103a, and a buffer manager (a second transferor) 2103bB is provided instead of the buffer manager 2103b.

In the second LA communication state, the protocol processor 2103aB establishes the connection (the first sub connection) according to the communication protocol through the first communication path connecting the relay device 21 with the mobile station 41 as the first LA communication path. Similarly, in the second LA communication state, the protocol processor 2103aB establishes the connection (the second sub connection) according to the communication protocol through the second communication path connecting the relay device 21 with the mobile station 41 as the second LA communication path. The first sub connection is also referred to as a "sub connection #1-1". The second sub connection is also referred to as a "sub connection #1-2".

In this example, the first wireless communication scheme is the LTE as described above. A connection established in the LTE is an address maintaining connection in which even when a route of the connection is changed as the base station performs a handover operation, an IP address allocated to the mobile station 41 is maintainable. IP stands for Internet protocol. Thus, in this example, the first sub connection is the address maintaining connection. The first wireless communication scheme may be a wireless communication scheme capable of establishing the address maintaining connection.

Further, in the second LA communication state, when the LA connection state notification is received from the base station #1, the protocol processor 2103aB releases the sub connection other than the address maintaining connection among the established sub connections. In other words, in this example, in this case, the protocol processor 2103aB releases only the second sub connection.

The buffer manager 2103bB has a function similar to that of the buffer manager 2103b except that the non-delivered packets are transmitted to the mobile station 41 through the first sub connection instead of transmitting the non-delivered packets to the base station #1. Specifically, in the second LA communication state, when the LA connection state notification is received from the base station #1, the buffer manager 2103bB causes the first buffer to store the non-delivered packets.

As a result, the buffer manager 2103bB transmits the packets stored in the first buffer through the first sub connection. In other words, the buffer manager 2103bB transmits the non-delivered packets to the mobile station 41 through the first sub connection (the address maintaining connection). The non-delivered packets are packets, in which the mobile station 41 is set as the destination, stored in the first buffer and the second buffer among packets received from the server device 11.

(Operation)

Next, an operation of the wireless communication system 1 according to the third embodiment will be described with reference to FIGS. 23 and 24.

Figure 24:
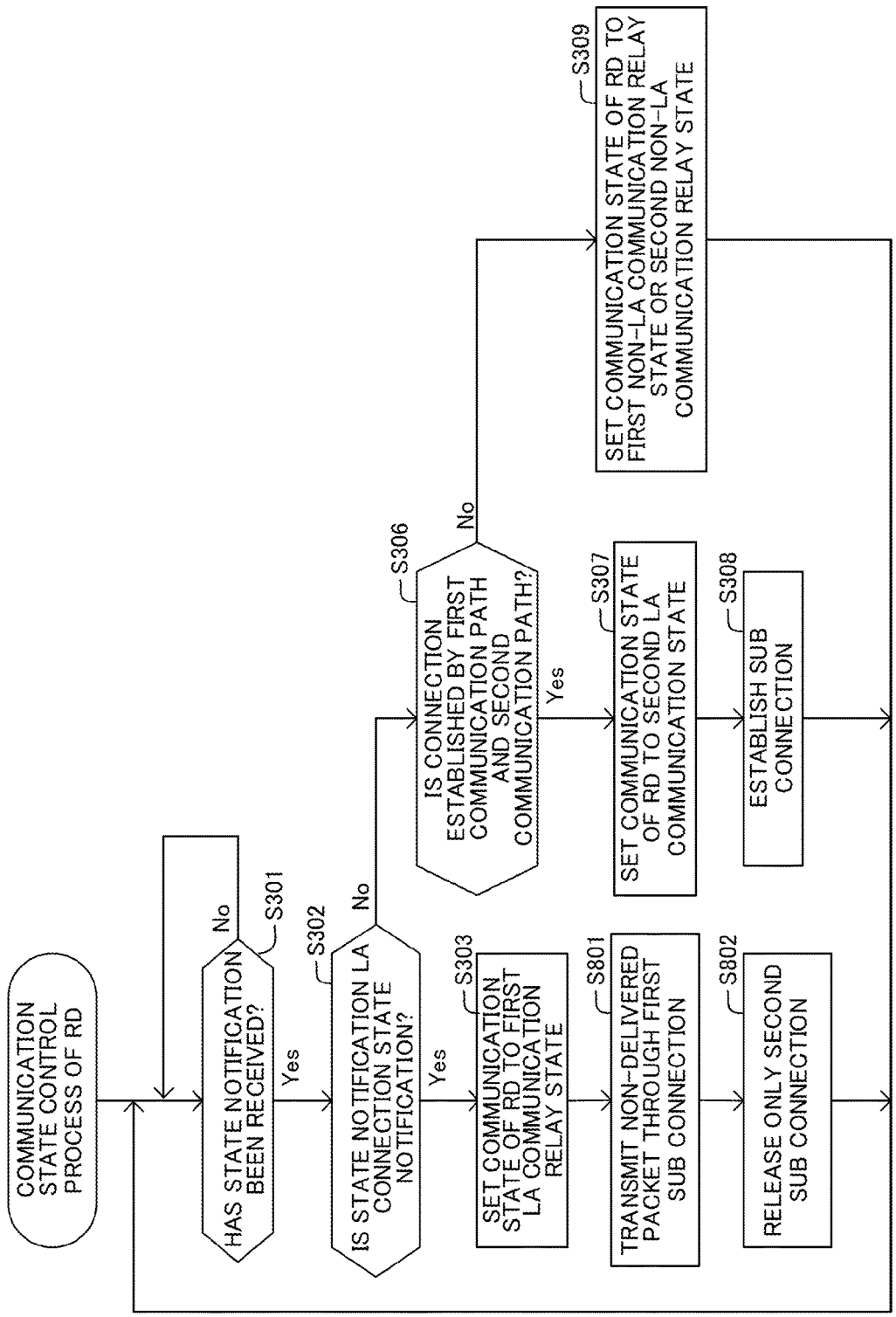
FIG. 24 is a flowchart illustrating an example of communication state control process executed by the relay device according to the third embodiment.

The relay device 21 according to the third embodiment executes a communication state control process illustrated in a flowchart in FIG. 24 instead of the communication state control process illustrated in FIG. 14. The communication state control process illustrated in FIG. 24 is a process in which the process of step S304 to step S305 of the communication state control process illustrated in FIG. 14 is replaced with a process of step S801 to step S802.

Figure 23:
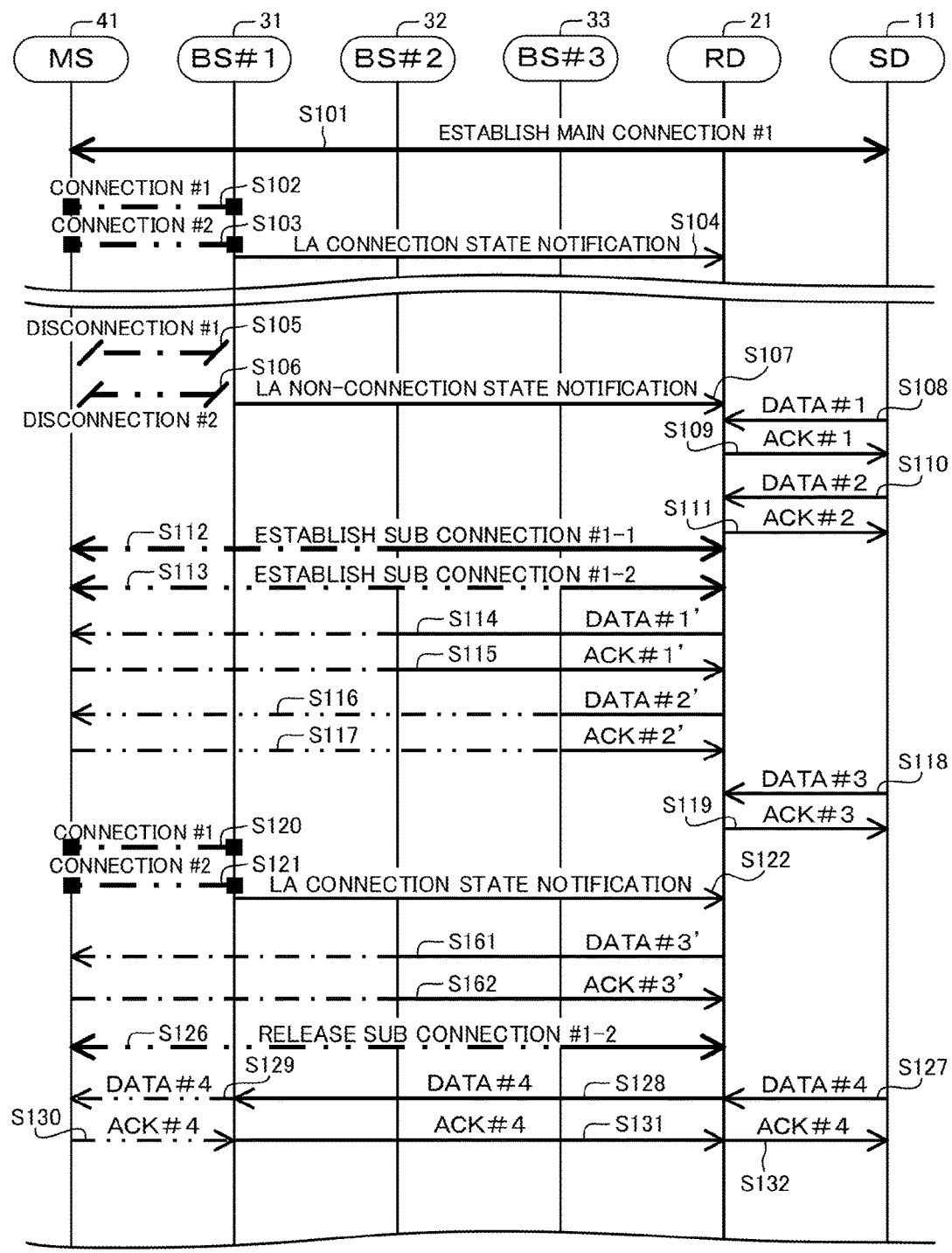
FIG. 23 is a sequence diagram illustrating an example of operation of a wireless communication system according to the third embodiment.

The wireless communication system 1 according to the third embodiment executes the process of step S101 to step S122 in FIG. 23, similarly to the wireless communication system 1 according to the first embodiment.

At this point in time, when the relay device 21 proceeds to step S801 in FIG. 24, there are non-delivered packets. In other words, the first buffer or the second buffer stores the packets (DATA#3) in which the mobile station 41 is set as the destination. The packets are packets (i.e., non-delivered packets), to which the ACK signal (the acknowledge response) have not received from the mobile station 41, held to be transmitted to the mobile station 41. Thus, the relay device 21 transmits (transfers) non-delivered packets (DATA#3 ') to the mobile station 41 through the sub connection #1-1 (step S801 in FIG. 24 and step S161 in FIG. 23).

Further, at this point in time, the sub connections #1-1 and #1-2 are established. Thus, when the relay device 21 proceeds to step S802 in FIG. 24, the relay device 21 releases only the sub connection #1-2 among the established sub connections #1-1 and #1-2 (step S802 in FIG. 24 and step S126 in FIG. 23).

Meanwhile, the mobile station 41 receives the non-delivered packets (DATA#3 ') from the relay device 21. At this point in time, when the mobile station 41 proceeds to step S502 in FIG. 16, the mobile station 41 determines "Yes", and transmits the ACK signal (ACK#3 ') for the sub connection #1-1 (step S503 in FIG. 16 and step S162 in FIG. 23). Specifically, the mobile station 41 transmits the ACK signal (ACK#3 ') to the transmission source (in this example, the relay device 21) set in the header for the sub connection #1-1 through the sub connection #1-1.

Thereafter, the wireless communication system 1 according to the third embodiment executes the process of step S127 to step S132 in FIG. 23, similarly to the wireless communication system 1 according to the first embodiment.

As described above, the wireless communication system 1 according to the third embodiment can have the same operations and effects as in the wireless communication system 1 according to the first embodiment.

Further, according to the wireless communication system 1 according to the third embodiment, when the LA connection state notification is received from the base station #1 while the second LA communication is being executed, the relay device 21 transmits the non-delivered packets to the mobile station 41 through the address maintaining connection.

Thus, even when the state of the wireless communication system 1 is switched from the state in which the second LA communication is executed to the state in which the first LA communication is executed, it is possible to reliably transmit packets, that are scheduled to be transmitted to the mobile station 41, to the mobile station 41.

Particularly, in the congestion control in the TCP, when a packet loss is large, the transmission rate is relatively significantly lowered. Thus, the throughput relatively significantly deteriorates. On the other hand, according to the wireless communication system 1 according to the third embodiment, it is possible to prevent the non-delivered packets from being lost, and thus it is possible to improve the throughput with a high degree of accuracy.

According to the wireless communication system 1 according to the third embodiment, when the packets in which the mobile station 41 is set as the destination are received while the second LA communication is being executed, the relay device 21 transmits the acknowledge response to the transmission source set to the packets. Further, when packets are not received through the sub connection, the mobile station 41 transmits the acknowledge response to the transmission source set to the packets. In addition, when packets have been received through the sub connection, the mobile station 41 does not transmit the acknowledge response to the outside.

Thus, the wireless communication system 1 can promptly transmit the acknowledge response to the transmission source set to the packets. As a result, it is possible to prevent the throughput between the transmission source and the relay device 21 from being wastefully decreased.

Further, it is possible to prevent the mobile station 41 from transmitting the acknowledge response to the packets for which the acknowledge response has been already transmitted by the relay device. As a result, it is possible to prevent the communication band of the wireless communication path between the mobile station 41 and the base station #1 from being wastefully decreased.

According to the wireless communication system 1 according to the third embodiment, when the LA connection state notification is received from the base station #1 while the second LA communication is being executed, the relay device 21 releases the sub connection other than the address maintaining connection among the sub connections.

Thus, even when the state of the wireless communication system 1 is switched from the state in which the second LA communication is executed to the state in which the first LA communication is executed, it is possible to prevent the state in which the sub connection other than the address maintaining connection is established from being wastefully continued.

The present invention has been described above with reference to the exemplary embodiment, but the present invention is not limited to the above embodiments. The configuration and the details of the present invention can be changed in various forms understood by a person skilled in the art within the scope of the present invention.

An arbitrary combination of the above embodiments and a modified example may be employed as another modified example of the above embodiments with the scope not departing from the gist of the present invention.

According to the wireless communication system of the present disclosure, it is possible to increase the throughput.

All examples and conditional language provided herein are intended for pedagogical purposes of aiding the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
a mobile station;
a base station that is configured to wirelessly communicate with the mobile station; and
a relay device that is arranged at a higher level side than the base station and configured to communicate with the base station,
wherein the base station comprises:
a first communicator that executes first link aggregation (LA) communication that is communication for transmitting packets to a plurality of wireless communication paths connecting the base station with the mobile station;
a first determiner that determines whether or not a state of the base station is an LA connection state in which the base station is connected with the mobile station such that the first LA communication is executable;
a first transmitter that transmits a state notification representing whether or not the state of the base station is the LA connection state to the relay device; and
a first controller that controls the first communicator such that the first LA communication is executed based on whether or not the state of the base station is the LA connection state,
wherein the relay device comprises:
a second communicator that executes second LA communication that is communication for transmitting packets to a plurality of communication paths connecting the relay device with the mobile station;
a receiver that receives the state notification from the base station;
a second controller that controls the second communicator such that the second LA communication is executed based on the state notification; and
a transferor that transfers a non-delivered packet that is not correctly received by the mobile station and held to be transmitted to the mobile station to the base station when the state notification representing that the state of the base station is the LA connection state is received while the second LA communication is being executed,
wherein the first communicator executes the first LA communication, and transmits the non-delivered packet transferred from the relay device to the mobile station, and
when the state of the base station is the LA connection state and the relay device executable the second LA communication that is communication for transmitting packets to the plurality of communication paths connecting the relay device with the mobile station, the first LA communication is executed and the second LA communication is not executed.

2. The wireless communication system according to claim 1,
wherein when the state of the base station is determined to be the LA connection state, the first transmitter transmits the state notification representing that the state of the base station is the LA connection state to the relay device,
when the state of the base station is determined to be the LA connection state, the first controller controls the first communicator such that the first LA communication is executed, and
when the state notification represents that the state of the base station is the LA connection state, the second controller controls the second communicator such that the second LA communication is not executed.

3. The wireless communication system according to claim 1,
wherein when the state of the base station is determined to be not the LA connection state, the first transmitter transmits the state notification representing that the state of the base station is not the LA connection state to the relay device,
when the state of the base station is determined to be not the LA connection state, the first controller controls the first communicator such that the first LA communication is not executed, and
when the state notification represents that the state of the base station is not the LA connection state, the second controller controls the second communicator such that the second LA communication is executed.

4. The wireless communication system according to claim 1,
wherein the relay device further comprises a second transmitter that, when a packet in which the mobile station is set as a destination has been received while the second LA communication is being executed, transmits an acknowledge response representing that the packet has been correctly received by the mobile station from a transmission source to the transmission source set to the packet,
the first communicator transmits the non-delivered packet to the mobile station together with flag information representing that the acknowledge response to the packet has been already transmitted, and
the mobile station further comprises a third transmitter that does not transmit the acknowledge response representing that the packet has been correctly received by the mobile station to an outside when the packet has been received through the first LA communication and the flag information has been received together with the packet or when the packet has been received through the second LA communication, and transmits the acknowledge response to the transmission source set to the packet when the packet has been received from the transmission source through the first LA communication but the flag information has not been received together with the packet.

5. The wireless communication system according to claim 1,
wherein the second communicator establishes connections according to a first communication protocol as each of the plurality of communication paths connecting the relay device with the mobile station, and executes the second LA communication using the established connections, and
the second communicator releases the established connections when the state notification representing that the state of the base station is the LA connection state is received while the second LA communication is being executed.

6. The wireless communication system according to claim 1,
wherein the second communicator establishes a connection according to a certain communication protocol as each of the plurality of communication paths connecting the relay device with the mobile station, and executes the second LA communication using the established connections, and
at least one of the plurality of established connections is an address maintaining connection in which an Internet protocol (IP) address allocated to the mobile station is maintainable even when a route of the at least one of the plurality of established connections is changed, and a second transferor transmits the non-delivered packet that is not correctly received by the mobile station and held to be transmitted to the mobile station to the mobile station through the address maintaining connection when the state notification representing that the state of the base station is the LA connection state is received while the second LA communication is being executed.

7. The wireless communication system according to claim 6,
wherein the relay device comprises a second transmitter that, when a packet in which the mobile station is set as a destination has been received while the second LA communication is being executed, transmits an acknowledge response representing that the packet has been correctly received by the mobile station from a transmission source to the transmission source set to the packet, and
the mobile station comprises a third transmitter that transmits the acknowledge response representing that the packet has been correctly received by the mobile station to the transmission source set to the packet when the packet has not been received through the connection between the relay station and the mobile station, and does not transmit the acknowledge response to an outside when the packet has been received through the connection between the relay station and the mobile station.

8. The wireless communication system according to claim 6,
wherein the second communicator releases at least one connection other than the address maintaining connection among the established connections when the state notification representing that the state of the base station is the LA connection state is received while the second LA communication is being executed.

9. The wireless communication system according to claim 1,
wherein the base station further comprises a second transferor that transfers the non-delivered packet that is not correctly received by the mobile station and held to be transmitted to the mobile station to the relay device when the state of the base station is changed to be not the LA connection state while the first LA communication is being executed, and
the second communicator executes the second LA communication, and transmits the non-delivered packet transferred from the base station to the mobile station.

10. The wireless communication system according to claim 9,
wherein the relay device further comprises a second transmitter that, when a first packet serving as the non-delivered packet has been received from the base station, or a second packet in which the mobile station is set as a destination has been received while the second LA communication is being executed, transmits an acknowledge response representing that the first or second packet has been correctly received by the mobile station from a transmission source to the transmission source set to the first or second packet, and
the mobile station comprises a third transmitter that transmits the acknowledge response to the transmission source set to the first or second packet when the first or second packet has been received through the first LA communication, and does not transmit the acknowledge response to an outside when the first or second packet has been received through the second LA communication.

11. A wireless communication method applied to a wireless communication system comprising a mobile station, a base station that is configured to wirelessly communicate with the mobile station, and a relay device that is arranged at a higher level side than the base station and configured to communicate with the base station, the wireless communication method comprising:
determining, by the base station, whether or not a state of the base station is a link aggregation (LA) connection state in which the base station is connected with the mobile station such that first LA communication that is communication for transmitting packets to a plurality of wireless communication paths connecting the base station with the mobile station is executable;
transmitting, by the base station, a state notification representing whether or not the state of the base station is the LA connection state to the relay device;
controlling the base station such that the first LA communication is executed based on whether or not the state of the base station is the LA connection state;
receiving, by the relay device, the state notification from the base station; and
controlling the relay device such that second LA communication that is communication for transmitting packets to a plurality of communication paths connecting the relay device with the mobile station is executed based on the state notification;
transferring a non-delivered packet that is not correctly received by the mobile station and held to be transmitted to the mobile station to the base station when the state notification representing that the state of the base station is the LA connection state is received while the second LA communication is being executed; and
executing the first LA communication, and transmitting the non-delivered packet transferred from the relay device to the mobile station,
wherein when the state of the base station is the LA connection state and the relay device executable the second LA communication that is communication for transmitting packets to the plurality of communication paths connecting the relay device with the mobile station, the first LA communication is executed and the second LA communication is not executed.

12. The wireless communication method according to claim 11,
wherein the base station transmits the state notification representing that the state of the base station is the LA connection state to the relay device when the state of the base station is determined to be the LA connection state,
the base station is controlled such that the first LA communication is executed when the state of the base station is determined to be the LA connection state, and
the relay device is controlled such that the second LA communication is not executed when the state notification represents that the state of the base station is the LA connection state.

13. The wireless communication method according to claim 11,
wherein the base station transmits the state notification representing that the state of the base station is not the LA connection state to the relay device when the state of the base station is determined to be not the LA connection state, the base station is controlled such that the first LA communication is not executed when the state of the base station is determined to be not the LA connection state, and the relay device is controlled such that the second LA communication is executed when the state notification represents that the state of the base station is not the LA connection state.

14. A base station of a wireless communication system including a mobile station, the base station that is configured to wirelessly communicate with the mobile station, and a relay device that is arranged at a higher level side than the base station and configured to communicate with the base station, the base station comprising:

a first communicator that executes first link aggregation (LA) communication that is communication for transmitting packets to a plurality of wireless communication paths connecting the base station with the mobile station;

a first determiner that determines whether or not a state of the base station is an LA connection state in which the base station is connected with the mobile station such that the first LA communication is executable;

a first transmitter that transmits a state notification representing whether or not the state of the base station is the LA connection state to the relay device; and a first controller that controls the first communicator such that the first LA communication is executed based on whether or not the state of the base station is the LA connection state, wherein the first communicator executes the first LA communication, and transmits a non-delivered packet to the mobile station, the non-delivered packet being transferred from the relay device when the state notification representing that the state of the base station is the LA connection state is received while the second LA communication is being executed, and being not correctly received by the mobile station and held to be transmitted to the mobile station to the base station, and when the state of the base station is the LA connection state and the relay device executable the second LA communication that is communication for transmitting packets to the plurality of communication paths connecting the relay device with the mobile station, the first LA communication is executed and the second LA communication is not executed.

15. The base station according to claim 14, wherein when the state of the base station is determined to be the LA connection state, the first transmitter transmits the state notification representing that the state of the base station is the LA connection state to the relay device, and when the state of the base station is determined to be the LA connection state, the first controller controls the first communicator such that the first LA communication is executed.

16. The base station according to claim 14, wherein when the state of the base station is determined to be not the LA connection state, the first transmitter transmits the state notification representing that the state of the base station is not the LA connection state to the relay device, and when the state of the base station is determined to be not the LA connection state, the first controller controls the first communicator such that the first LA communication is not executed.

17. A relay device of a wireless communication system including a mobile station, a base station that is configured to wirelessly communicate with the mobile station, and the relay device that is arranged at a higher level side than the base station and configured to communicate with the base station, the relay device comprising:

a communicator that executes second LA communication that is communication for transmitting packets to a plurality of communication paths connecting the relay device with the mobile station;

a receiver that receives a state notification from the base station, the state notification representing whether or not a state of the base station is a link aggregation (LA) connection state in which the base station is connected with the mobile station such that first LA communication that is communication for transmitting packets to a plurality of wireless communication paths connecting the base station with the mobile station is executable;

a controller that controls the communicator such that the second LA communication is executed based on the state notification; and a transferor that transfers a non-delivered packet that is not correctly received by the mobile station and held to be transmitted to the mobile station to the base station to execute the first LA communication when the state notification representing that the state of the base station is the LA connection state is received while the second LA communication is being executed, wherein when the state of the base station is the LA connection state and the relay device executable the second LA communication that is communication for transmitting packets to the plurality of communication paths connecting the relay device with the mobile station, the first LA communication is executed and the second LA communication is not executed, the second LA communication being communication for transmitting packets to a plurality of communication paths connecting the relay device with the mobile station.

18. The relay device according to claim 17, wherein the controller controls the communicator such that the second LA communication is not executed when the state notification represents that the state of the base station is the LA connection state.

19. A mobile station of a wireless communication system including the mobile station, a base station that is configured to wirelessly communicate with the mobile station, and a relay device that is arranged at a higher level side than the base station and configured to communicate with the base station, the mobile station comprising:

a transmitter that:

does not transmit an acknowledge response representing that a packet has been correctly received by the mobile station to an outside when the packet has been received through first link aggregation (LA) communication and flag information has been received together with the packet, the first LA communication being communication for transmitting packets including the packet to a plurality of wireless communication paths connecting the base station with the mobile station, the flag information representing that an acknowledge response to the packet has been already transmitted;

transmits the acknowledge response to a transmission source set to the packet when the packet has been received from the transmission source through the first LA communication but the flag information has not been received together with the packet; and does not transmit an acknowledge response representing that a packet has been correctly received by the mobile station to an outside when the packet has been received through second LA communication, the second LA communication being communication for transmitting packets including the packet to a plurality of communication paths connecting the relay device with the mobile station; and a receiver that receives a non-delivered packet from the base station by executing the first LA communication, the non-delivered packet being transferred from the relay device to the base station when the state notification representing that the state of the base station is the LA connection state is received while the second LA communication is being executed, and being not correctly received by the mobile station and held to be transmitted to the mobile station to the base station, wherein when the state of the base station is the LA connection state and the relay device executable the second LA communication that is communication for transmitting packets to the plurality of communication paths connecting the relay device with the mobile station, the first LA communication is executed and the second LA communication is not executed.

\* \* \* \* \*